United States Patent
Kale et al.

(10) Patent No.: US 12,022,764 B2
(45) Date of Patent: Jul. 2, 2024

(54) PLANTER CONTROL USING TIMESTAMP/LOCATION STAMPS

(71) Applicant: Deere & Company, Moline, IL (US)

(72) Inventors: Pradeep Kale, Parbhani (IN); Jason D. Walter, Bettendorf, IA (US); Omkar Joshi, Chinchwad (IN)

( * ) Notice: Subject to any disclaimer, the term of this patent is extended or adjusted under 35 U.S.C. 154(b) by 0 days.

(21) Appl. No.: 18/053,049

(22) Filed: Nov. 7, 2022

(65) Prior Publication Data

US 2023/0136658 A1 May 4, 2023

Related U.S. Application Data

(63) Continuation of application No. 16/895,145, filed on Jun. 8, 2020, now Pat. No. 11,510,357.

(51) Int. Cl.
*A01C 7/10* (2006.01)
*A01C 7/04* (2006.01)
*A01C 7/20* (2006.01)

(52) U.S. Cl.
CPC .............. *A01C 7/102* (2013.01); *A01C 7/046* (2013.01); *A01C 7/105* (2013.01); *A01C 7/20* (2013.01)

(58) Field of Classification Search
CPC ......... A01C 7/102; A01C 7/046; A01C 7/105; A01C 7/20; A01B 79/005
USPC .......................................................... 701/50
See application file for complete search history.

(56) References Cited

U.S. PATENT DOCUMENTS

| | | |
|---|---|---|
| 11,510,357 B2 | 11/2022 | Kale et al. |
| 2011/0046776 A1 | 2/2011 | Goldman et al. |
| 2013/0008361 A1 | 1/2013 | Trevino et al. |
| 2013/0030565 A1 | 1/2013 | Zielke |
| 2013/0124055 A1 | 5/2013 | Baurer et al. |
| 2013/0269578 A1 | 10/2013 | Grimm et al. |
| 2014/0230392 A1 | 8/2014 | Dybro et al. |
| 2015/0094916 A1 | 4/2015 | Bauerer et al. |
| 2016/0037709 A1 | 2/2016 | Sauder et al. |
| 2017/0322550 A1* | 11/2017 | Yokoyama ............ A01B 63/111 |
| 2018/0014457 A1 | 1/2018 | Mertlich et al. |
| 2018/0168094 A1* | 6/2018 | Koch ...................... G01J 5/025 |
| 2018/0184578 A1 | 7/2018 | Stuber |

(Continued)

FOREIGN PATENT DOCUMENTS

WO     2015127397 A1     8/2015

OTHER PUBLICATIONS

Extended European Search Report and Written Opinion Issued in European Patent Application No. 21177431.0, dated Oct. 22, 2021, in 08 pages.

*Primary Examiner* — Tyler D Paige
(74) *Attorney, Agent, or Firm* — Kelly, Holt & Christenson; Joseph R. Kelly

(57) ABSTRACT

A plurality of different controllers on an agricultural machine are time synchronized. A first controller, identifies an action to be taken based upon a location of the agricultural machine and a speed of the agricultural machine, and also based on a geographic location of where the action is to be taken, and generates a timestamp indicating a time at which the action is to be taken. An action identifier and the timestamp are sent to an actuator controller that controls an actuator to take the action. The actuator controller identifies an actuator delay corresponding to the actuator and controls the actuator to take the action at a time identified in the timestamp based upon the actuator delay.

20 Claims, 16 Drawing Sheets

(56) References Cited

U.S. PATENT DOCUMENTS

2020/0201839 A1\* 6/2020 Lee ..................... G06F 16/215
2021/0378164 A1 12/2021 Kale et al.

\* cited by examiner

US 12,022,764 B2

PLANTER CONTROL USING TIMESTAMP/LOCATION STAMPS

CROSS-REFERENCE TO RELATED APPLICATION

The present application is a continuation of and claims priority of U.S. patent application Ser. No. 16/895,145, filed Jun. 8, 2020, the content of which is hereby incorporated by reference in its entirety.

FIELD OF THE DESCRIPTION

The present description relates to controlling agricultural machines. More specifically, the present description relates to controlling agricultural machines by applying timestamps/location stamps to events on the agricultural machine and transmitting those timestamps through a control system architecture on the agricultural machine.

BACKGROUND

There are a wide variety of different types of agricultural machines. Such agricultural machines can include different kinds of seeders or planters, as well as sprayers, and other equipment.

These types of equipment often attempt to perform location-based agricultural operations. For instance, planters can attempt to perform section control (where different sections of the planter are enabled or disabled) based on location. The same type of control can be attempted for sprayers. In this way, when the planter or sprayer approaches an area of the field that has already been treated (either planted or sprayed), certain actuators can be deactivated in order to avoid treating that same area twice.

Also, these types of systems often attempt to provide accurate operator feedback indicative of an area that has already been treated. For instance, it is not uncommon for a planter to attempt to provide information to an operator display system that is indicative of an as-applied map. By way of example, the system may attempt to display a map for the operator indicating seed locations, where seed has already been planted.

The discussion above is merely provided for general background information and is not intended to be used as an aid in determining the scope of the claimed subject matter.

SUMMARY

A plurality of different controllers on an agricultural machine are time synchronized. A positioning system detects a geographic location and a timestamp, which is indicative of a time when the geographic location was sensed, is applied to the geographic location. A first controller, that identifies an action to be taken based upon a location of the agricultural machine and a speed of the agricultural machine, and also based on a geographic location of where the action is to be taken, generates a future timestamp indicating a future time at which the action is to be taken. An action identifier (that identifies the action) and the future timestamp is sent to an actuator controller that controls an actuator to take the action. The actuator controller identifies an actuator delay corresponding to the actuator and controls the actuator to take the action at a time identified in the future timestamp based upon the future timestamp, a current time, and the actuator delay.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
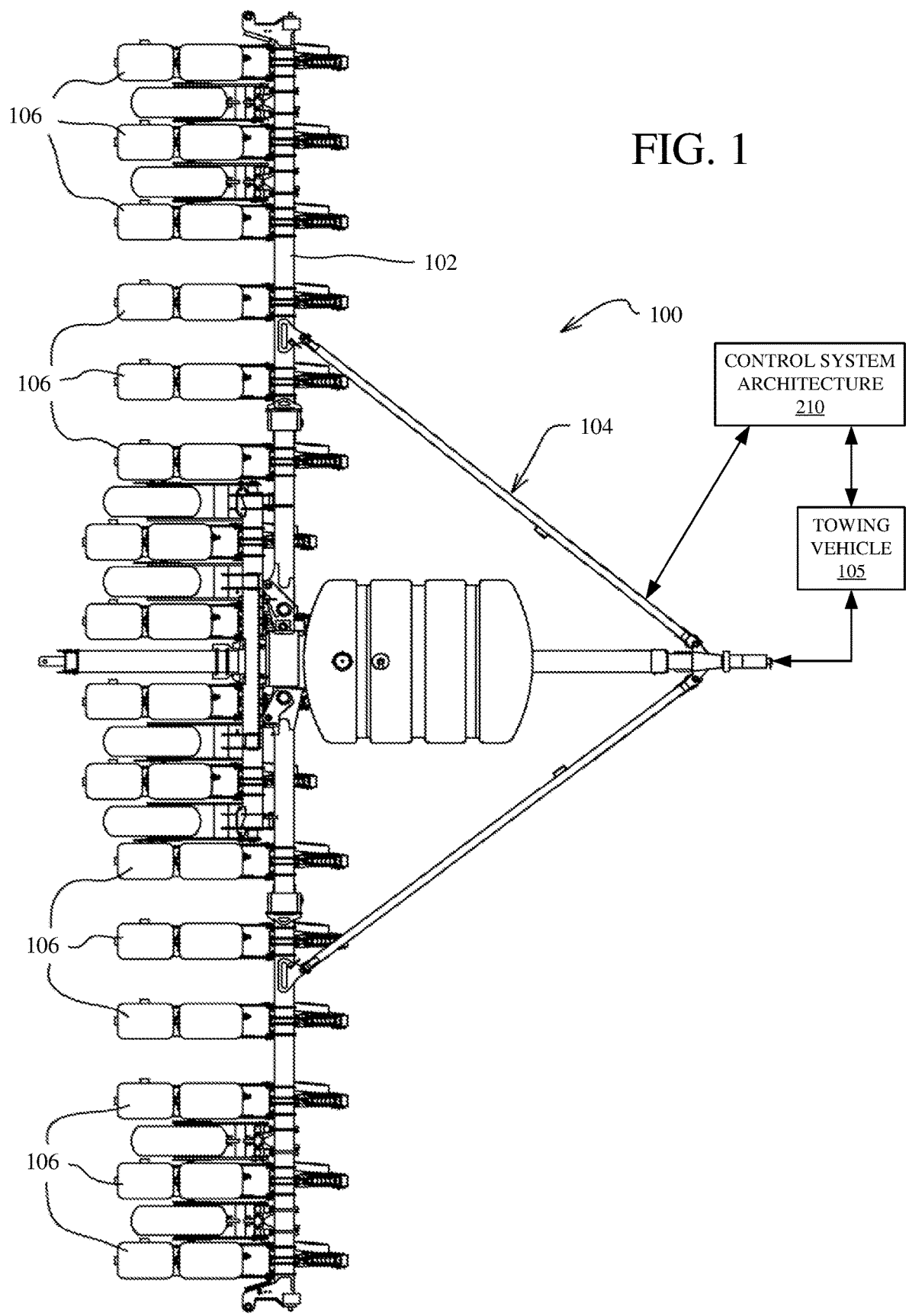
FIG. 1 shows one example of a top view of an agricultural machine.

As discussed above, it is not uncommon for agricultural machines to attempt to perform location-based operations. By way of example, a planting machine may be implemented with section control features which allow different sections of the planter to be turned on or off independently. Thus, when the planting machine is reaching an end row, or is reaching an area of the field that has already been planted, the planting machine may attempt to turn off the sections of the planter so that they do not perform an overlapping planting operation in which seeds are planted over an area that has already been planted.

This can be problematic. For instance, many such machines have a control system architecture that includes multiple different processors. A first processor may determine the action to be taken (such as to turn off a section of the planter), and that command may be sent to an intermediate controller which translates it to determine which particular row units of the planter need to be turned off. The intermediate controller then transmits that information to an ultimate controller which actually turns off the row unit actuators so that the planter on that row unit is no longer planting. There are multiple delays associated with this type of architecture.

The first controller may have a processing delay in simply determining what operation is to be taken. The second controller may introduce an additional delay in translating that into individual row unit commands. The row unit, itself, may introduce additional delays corresponding to the actuators. For instance, there may be a delay between the time when an off signal is applied to a row unit actuator, and when the actuator actually stops working. Similarly, there may be a delay introduced between when an on signal is applied to the actuator, and when the actuator actually starts running. There may also be delays introduced by communicating information between different components.

It is also not uncommon for such agricultural systems to attempt to provide a real-time display to the operator indicating the results of operations that are being performed. For instance, a display system may attempt to show a real-time seed map indicating where seeds have been planted in the field, as the operation is proceeding. This can also be problematic due to the delays in the architecture. For instance, there may be a delay between the time when a seed sensor actually senses a seed, and when that seed is placed in the ground. Similarly, the seed sensor signal may be provided to the ultimate controller which, itself, provides it to an intermediate controller. The intermediate controller may determine a section status based upon the seed signal (i.e., the section is on, or it is off) and that information is then transferred to the first controller which processes it and generates a map output that is provided to the display device so that the seed map can be displayed, in near real-time, to the operator.

While the delays may not be very long, even relatively short delays can introduce significant inaccuracies into the system. For instance, assume that the planter is traveling at 10 miles per hour. Assume that the processing and other delays introduced by the various controllers, and the seed sensor, collectively result in a 500 milliseconds delay. This results in a spatial gap of 7.33 feet. That is, the display controller will display the seed location on the near real-time map in a position that is 7.33 feet displaced from the actual seed location. These inaccuracies can result in skipped locations (where no seed is planted), and overlapped locations (where seed is planted twice, in an overlapping arrangement). Similarly, these inaccuracies can result in mapping that is an incorrect reflection of the in-ground seed placement. These inaccuracies can be exacerbated in transition areas where the planter (or sections of the planter) are being turned on and off.

The present description thus proceeds with respect to a system in which the multiple controllers are all synchronized to a common time base. Then, sensor signals that sense variables (such as a GPS sensor signal or a seed sensor signal) are augmented with a timestamp indicating when the sensor signal was generated. Similarly, command signals (such as a section on command for a planter) is also augmented with a future timestamp that indicates a future time at which the commanded action is to be performed. This increases the accuracy of the system, because it can be operated accurately despite the delays.

In another example, a location stamp is applied to the sensor signals and to the command signals. The location stamp identifies the location of the planter when the sensor signal was generated, and when the commanded action is to be taken. This also increases the accuracy of the system, also because it can be operated accurately, despite the delays.

Before describing the system in more detail, a number of different examples of agricultural machines will be described. An agricultural planter is first described, along with a number of different seed metering systems and seed delivery systems.

FIG. 1 is a top view of one example of an agricultural machine 100. Agricultural machine 100 illustratively includes a toolbar 102 that is part of a frame 104. FIG. 1 also shows that a plurality of row units 106 are mounted to the toolbar. Agricultural machine 100 can be towed behind another machine 105, such as a tractor. A control system architecture 210 is described in greater detail below, and it can be on one of the machines 100, 104 or elsewhere or distributed across various locations.

Figure 2:
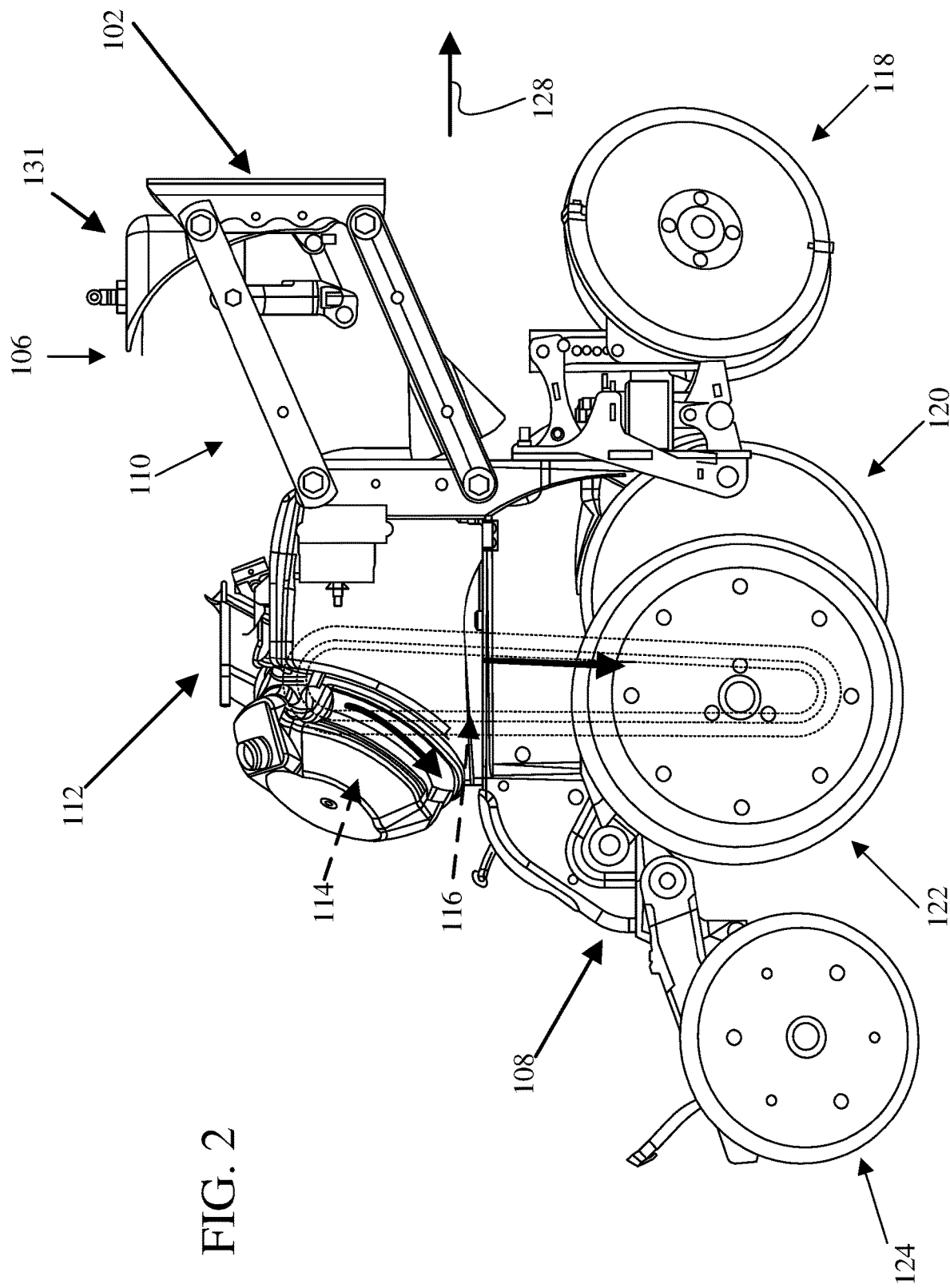
FIG. 2 shows one example of a side view of a row unit of the agricultural machine shown in FIG. 1.

FIG. 2 is a side view showing one example of a row unit 106 in more detail. FIG. 2 shows that each row unit 106 illustratively has a frame 108. Frame 108 is illustratively connected to toolbar 102 by a linkage shown generally at 110. Linkage 110 is illustratively mounted to toolbar 102 so that it can move upwardly and downwardly (relative to toolbar 102).

Row unit 106 also illustratively has a seed hopper 112 that stores seed. The seed is provided from hopper 112 to a seed metering system 114 that meters the seed and provides the metered seed to a seed delivery system 116 that delivers the seed from the seed metering system 114 to the furrow or trench generated by the row unit. In one example, seed metering system 114 uses a rotatable member, such as a disc or concave-shaped rotating member, and an air pressure differential to retain seed on the disc and move it from a seed pool of seeds (provided from hopper 112) to the seed delivery system 116. Other types of meters can be used as well.

Row unit 106 can also include a row cleaner 118, a furrow opener 120, a set of gauge wheels 122, and a set of closing wheels 124. It can also include an additional hopper that can be used to provide additional material, such as a fertilizer or another chemical.

In operation, as row unit 106 moves in the direction generally indicated by arrow 128, row cleaner 118 generally cleans the row ahead of the opener 120 to remove plant debris from the previous growing season and the opener 120 opens a furrow in the soil. Gauge wheels 122 illustratively control a depth of the furrow, and seed is metered by seed metering system 114 and delivered to the furrow by seed delivery system 116. Closing wheels 124 close the trench over the seed. A downforce generator 131 can also be provided to controllably exert downforce to keep the row unit in desired engagement with the soil.

Figure 3:
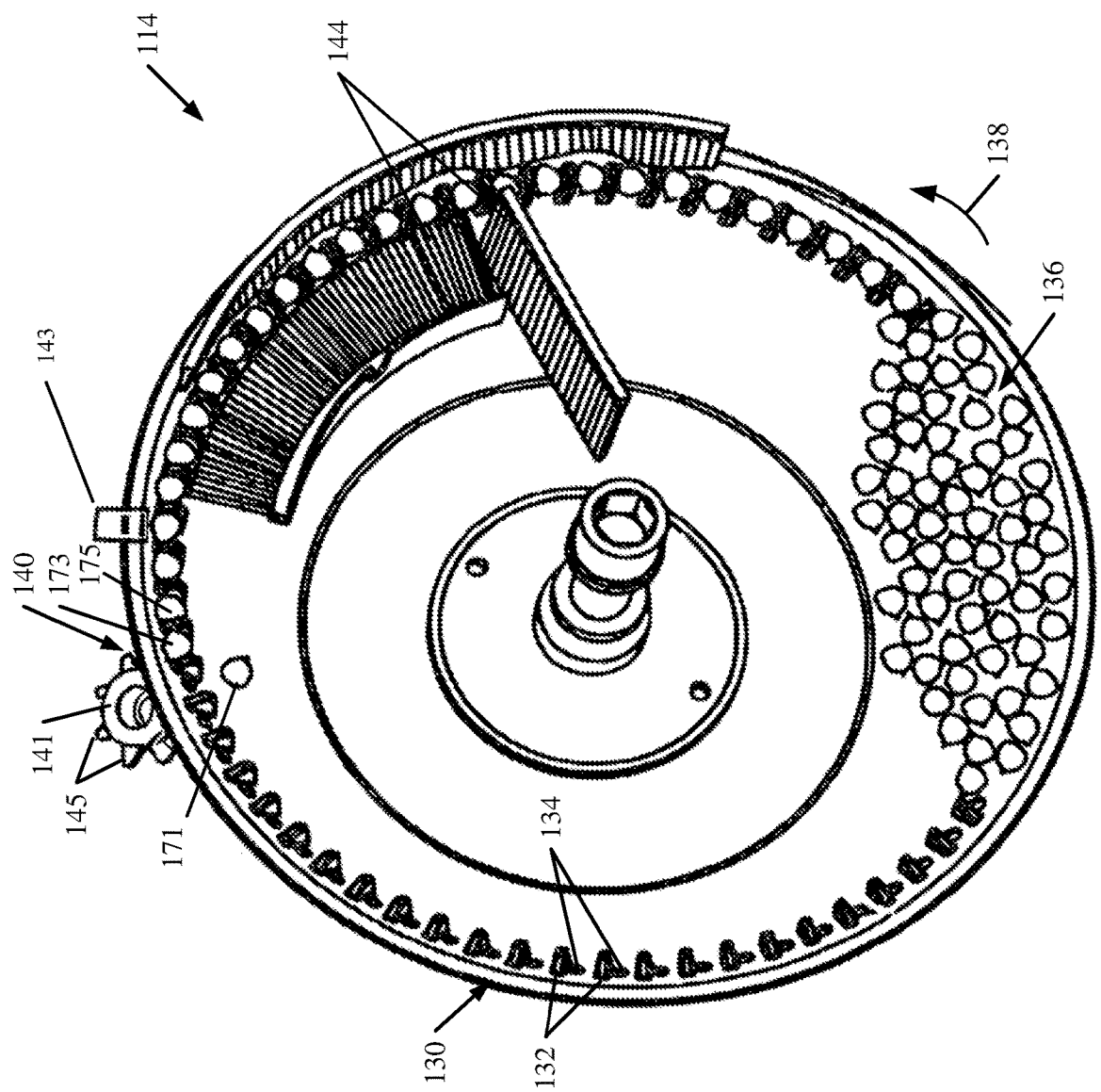
FIG. 3 is a perspective view of a portion of a seed metering system.

FIG. 3 shows one example of a rotatable mechanism that can be used as part of the seed metering system. The rotatable mechanism includes a rotatable disc, or concave element, 130. Rotatable element 130 has a cover (not shown) and is rotatably mounted relative to the frame 108 of the row unit 106. Rotatable element 130 is driven by an actuator (such as a motor shown in FIG. 5) and has a plurality of projections or tabs 132 that are closely proximate corresponding apertures 134. A seed pool 136 is disposed generally in a lower portion of an enclosure formed by rotating mechanism 130 and its corresponding cover. Mechanism 130 is rotatably driven by its actuator (such as an electric motor, a pneumatic motor, a hydraulic motor, etc.) for rotation generally in the direction indicated by arrow 138, about a hub. A pressure differential is introduced into the interior of the metering mechanism so that the pressure differential influences seeds from seed pool 136 to be drawn to apertures 134. For instance, a vacuum can be applied to draw the seeds from seed pool 136 so that they come to rest in apertures 134, where the vacuum holds them in place. Alternatively, a positive pressure can be introduced into the interior of the metering mechanism to create a pressure differential across apertures 134 to perform the same function.

Once a seed comes to rest in (or proximate) an aperture 134, the vacuum or positive pressure differential acts to hold the seed within the aperture 134 such that the seed is carried upwardly generally in the direction indicated by arrow 138, from seed pool 136, to a seed discharge area 140. It may happen that multiple seeds are residing in an individual seed cell. In that case, a set of brushes or other members 144 that are located closely adjacent the rotating seed cells tend to remove the multiple seeds so that only a single seed is carried by each individual cell. Additionally, a seed sensor 143 is also illustratively mounted adjacent to rotating mechanism 130 as will be discussed in FIG. 5.

Once the seeds reach the seed discharge area 140, the vacuum or other pressure differential is illustratively removed, and a positive seed removal wheel (knock-out wheel) 141 can act to remove the seed from the seed cell. Wheel 141 illustratively has a set of projections 145 that protrude at least partially into apertures 134 to actively dislodge the seed from those apertures. When the seed is dislodged, it is illustratively moved by the seed delivery system 116 (three examples of which are shown below in FIGS. 3A, 3B and 4) to the furrow in the ground.

Figure 3A:
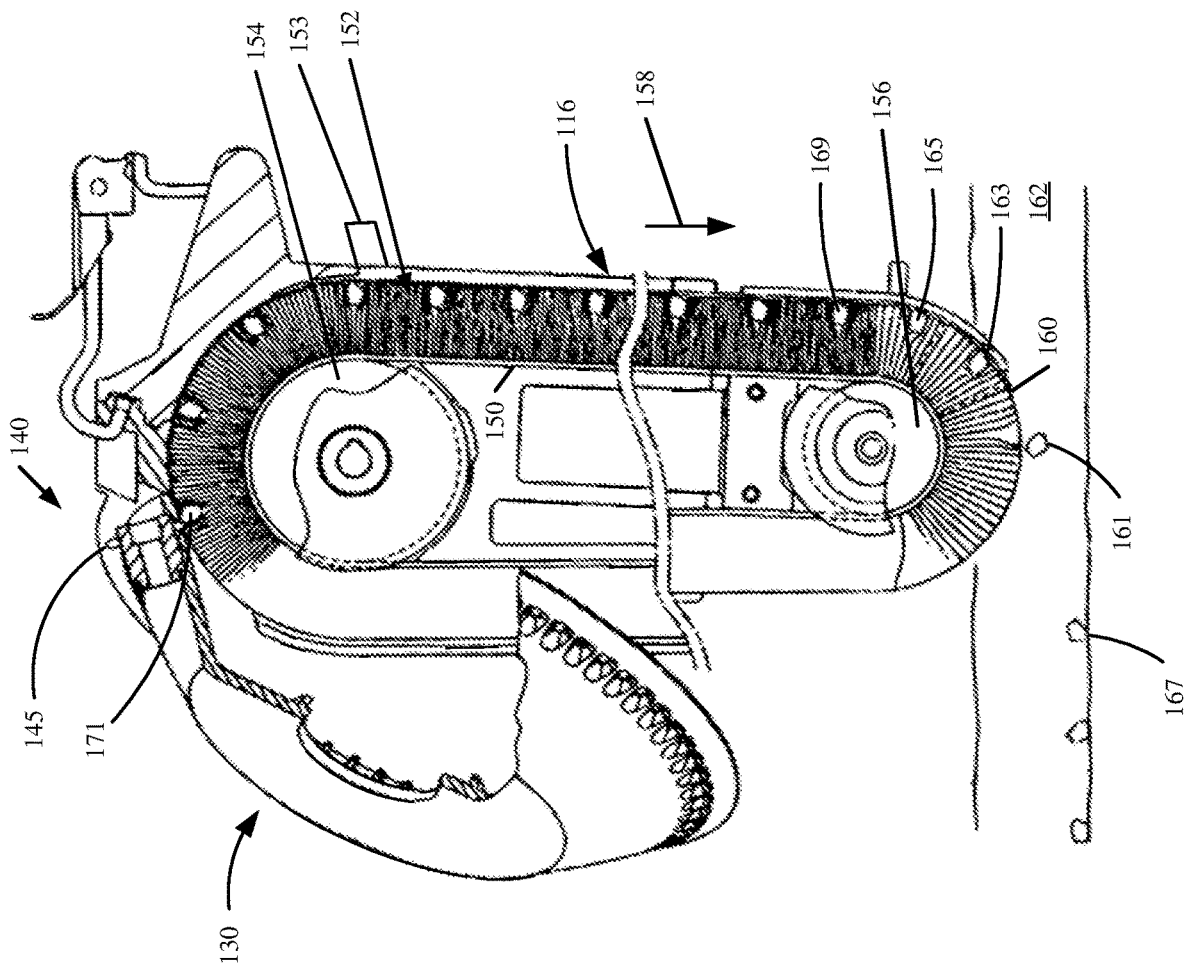
FIGS. 3A and 3B show two different examples of seed delivery systems that can be used with a seed metering system.

FIG. 3A shows an example where the rotating element 130 is positioned so that its seed discharge area 140 is above, and closely proximate, seed delivery system 116 which includes a seed transport mechanism. In the example shown in FIG. 3A, the seed transport mechanism includes a belt 150 with a brush that is formed of distally extending bristles 152 attached to belt 150. Belt 150 is mounted about pulleys 154 and 156. One of pulleys 154 and 156 is illustratively a drive pulley while the other is illustratively an idler pulley. The drive pulley is illustratively rotatably driven by an actuator for a conveyance motor (such as that shown in FIG. 5) which can be an electric motor, a pneumatic motor, a hydraulic motor, etc. Belt 150 is driven generally in the direction indicated by arrow 158.

Therefore, when seeds are moved by rotating element 130 to the seed discharge area 140, where they are discharged from the seed cells in rotating mechanism 130, they are illustratively positioned within the bristles (e.g., in a receiver) 152 by the projections 132 following each aperture that pushes the seed into the bristles. Seed delivery system 116 illustratively includes walls that form an enclosure around the bristles, so that, as the bristles move in the direction indicated by arrow 158, the seeds are carried along with them from the seed discharge area 140 of the metering mechanism, to a discharge area 160 either at ground level, or below ground level within a trench or furrow 162 that is generated by the furrow opener 120 on the row unit.

Additionally, a sensor 153 is also illustratively coupled to seed delivery system 116. As the seeds are moved within bristles 152, sensor 153 can detect the presence or absence of a seed as will be discussed below with respect to other FIGS. It should also be noted that while the present description will proceed as having sensors 143 and 153, it is expressly contemplated that, in another example, only one sensor is used. Additional sensors can also be used.

Figure 3B:
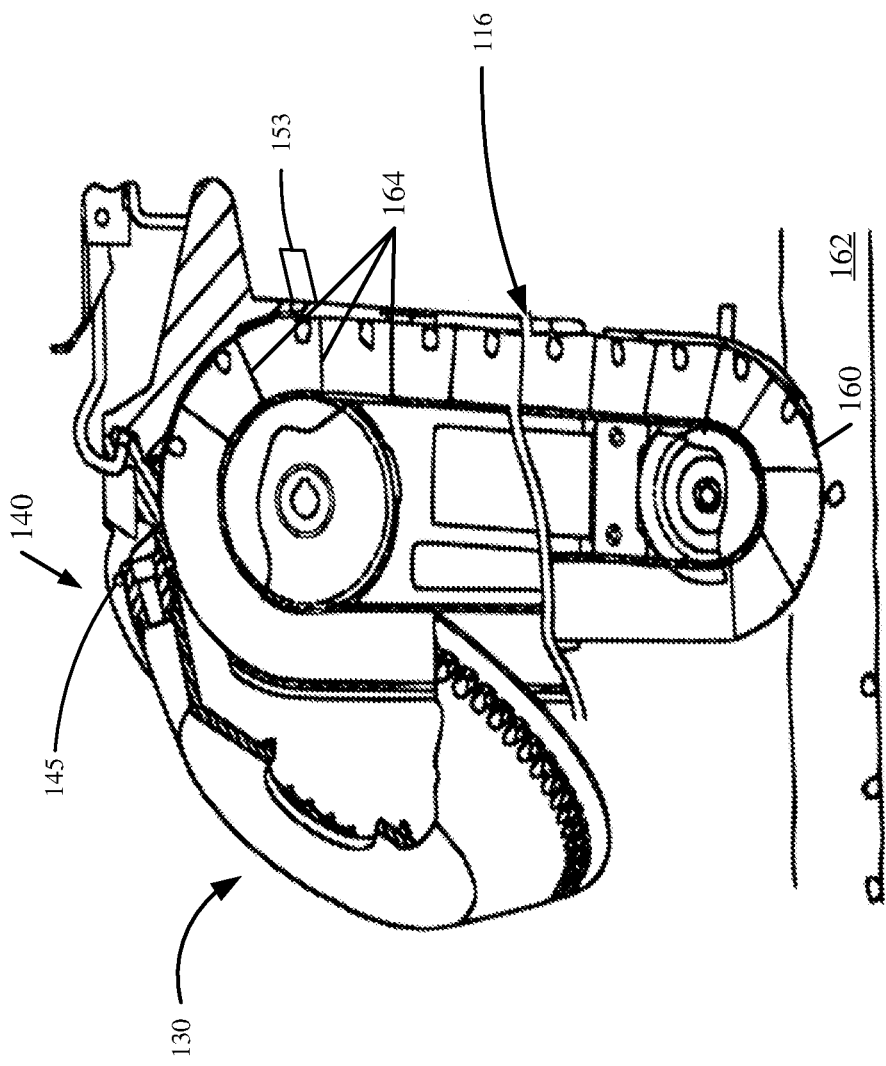

FIG. 3B is similar to FIG. 3A, except that seed delivery system 116 is not formed by a belt with distally extending bristles. Instead, the transport mechanism includes a flighted belt in which a set of paddles 164 form individual chambers (or receivers), into which the seeds are dropped, from the seed discharge area 140 of the metering mechanism. The flighted belt moves the seeds from the seed discharge area 140 to the discharge area 160 within the trench or furrow 162.

Figure 4:
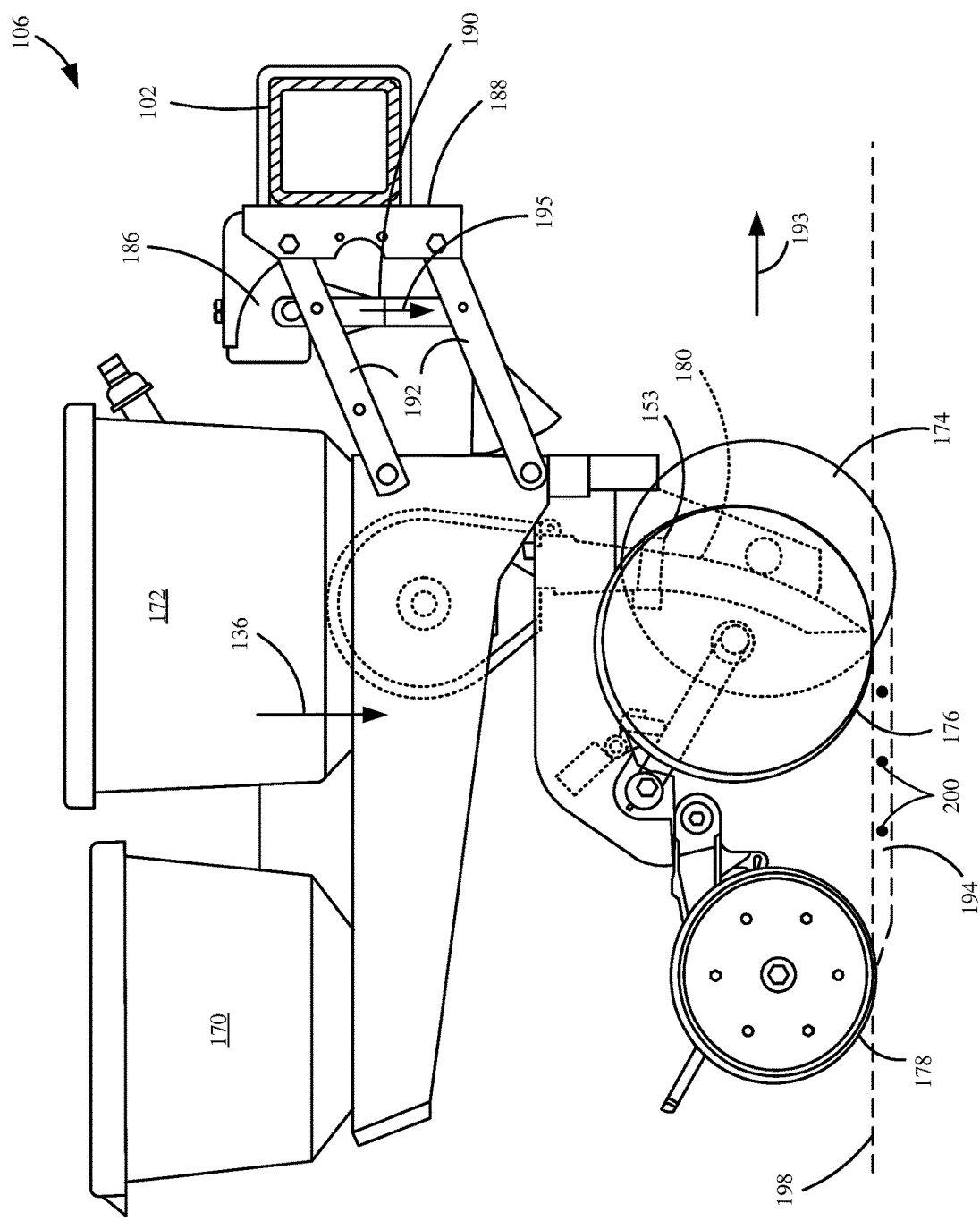
FIG. 4 shows another example of a side view of a row unit of the agricultural machine shown in FIG. 1, in which a seed tube is used as the seed delivery system.

FIG. 4 is a side view showing another example of a row unit 106 in which a seed tube 180 is used. Row unit 106 illustratively includes a chemical tank 170 and a seed storage tank 172. As with the row unit shown in FIG. 2, it also illustratively includes a disc opener 174, a set of gauge wheels 176, and a set of closing wheels 178. Seeds from tank 172 are fed by gravity into a seed meter (such as metering system 114 shown in previous FIGS.). The seed meter controls the rate at which seeds are dropped into seed tube 180 from seed storage tank 172. The seeds fall by gravity (or under the assistance of controlled fluid flow) through seed tube 180. The seeds can be sensed as they pass by seed sensor 153 in seed tube 180.

It will be noted that there are different types of seed meters, and the one that is shown is shown for the sake of example only. For instance, in one example, each row unit 106 need not have its own seed meter. Instead, metering or other singulation or seed dividing techniques can be performed at a central location, for groups of row units 106.

As with the row unit shown in FIG. 2, a downforce actuator 186 is mounted on a coupling assembly 188 that couples row unit 106 to toolbar 102. Actuator 186 can be a hydraulic actuator, a pneumatic actuator, a spring-based mechanical actuator or a wide variety of other actuators. In the example shown in FIG. 4, a rod 190 is coupled to a parallel linkage 192 and is used to exert an additional downforce (in the direction indicated by arrow 195) on row unit 106.

In operation, row unit 106 travels generally in the direction indicated by arrow 193. The double disc opener 174 opens a furrow 194 in the soil 198, and the depth of the furrow 194 is controlled by gauge wheel 176. Seeds 200 are dropped through seed tube 180, into the furrow 194 and closing wheels 178 close the soil.

There are a wide variety of other types of delivery systems as well, that include a transport mechanism and a receiver that receives a seed. For instance, they include dual belt delivery systems in which opposing belts receive, hold and move seeds to the furrow, a rotatable wheel that has sprockets which catch seeds from the metering system and move them to the furrow, multiple transport wheels that operate to transport the seed to the furrow, an auger, among others. The present description will proceed with respect to a brush belt, but many other delivery systems are contemplated herein as well.

It is noted that seed sensors 143 and 153 can be provided on metering system 114 and seed delivery system 116, in one example only seed delivery system 206 includes a seed sensor configured to sense the presence of seed as the seed passes the sensor location. The present description will proceed with respect to the seed delivery system being a brush belt as shown in FIG. 3A, and with seed sensor 153. This is only one example.

Seed sensor 153 can be any one of a variety of different types of sensors. In one example, the seed sensor 153 can include an optical or reflective sensor and thus includes a transmitter component and a receiver component. The transmitter component emits electromagnetic radiation, into seed delivery system 116 in the case of a reflective sensor. The receiver component then detects the reflected radiation and generates a signal indicative of the presence or absence of a seed adjacent to the sensor based on the reflected radiation. With other sensors, radiation such as light, is transmitted through the seed delivery system 116. When the light beam is interrupted by seed, the sensor signal varies to indicate a seed. Thus, the sensor generates a seed sensor signal that pulses or otherwise varies, and the pulses or variations are indicative of the presence of a seed passing the sensor location proximate the sensor.

In the example of a rotating brush belt, such as the example shown above with respect to FIG. 3A, bristles (e.g., bristles 152) absorb a majority of the radiation emitted from the transmitter component. As a result, absent a seed, reflected radiation received by the receiver is relatively low. Alternatively, when a seed passes the sensor location, more of the emitted light is reflected off the seed and back to the receiver component, indicating the presence of a seed. The differences in the reflected radiation allow for a determination to be made as to whether a seed is, in fact, present. Additionally, in other examples, a seed sensor can include a camera and image processing logic that provides vision detection as to whether a seed is current present within seed delivery system 116, at the sensor location proximate the sensor. Other seed sensors, at other locations, can also be used.

Figure 5:
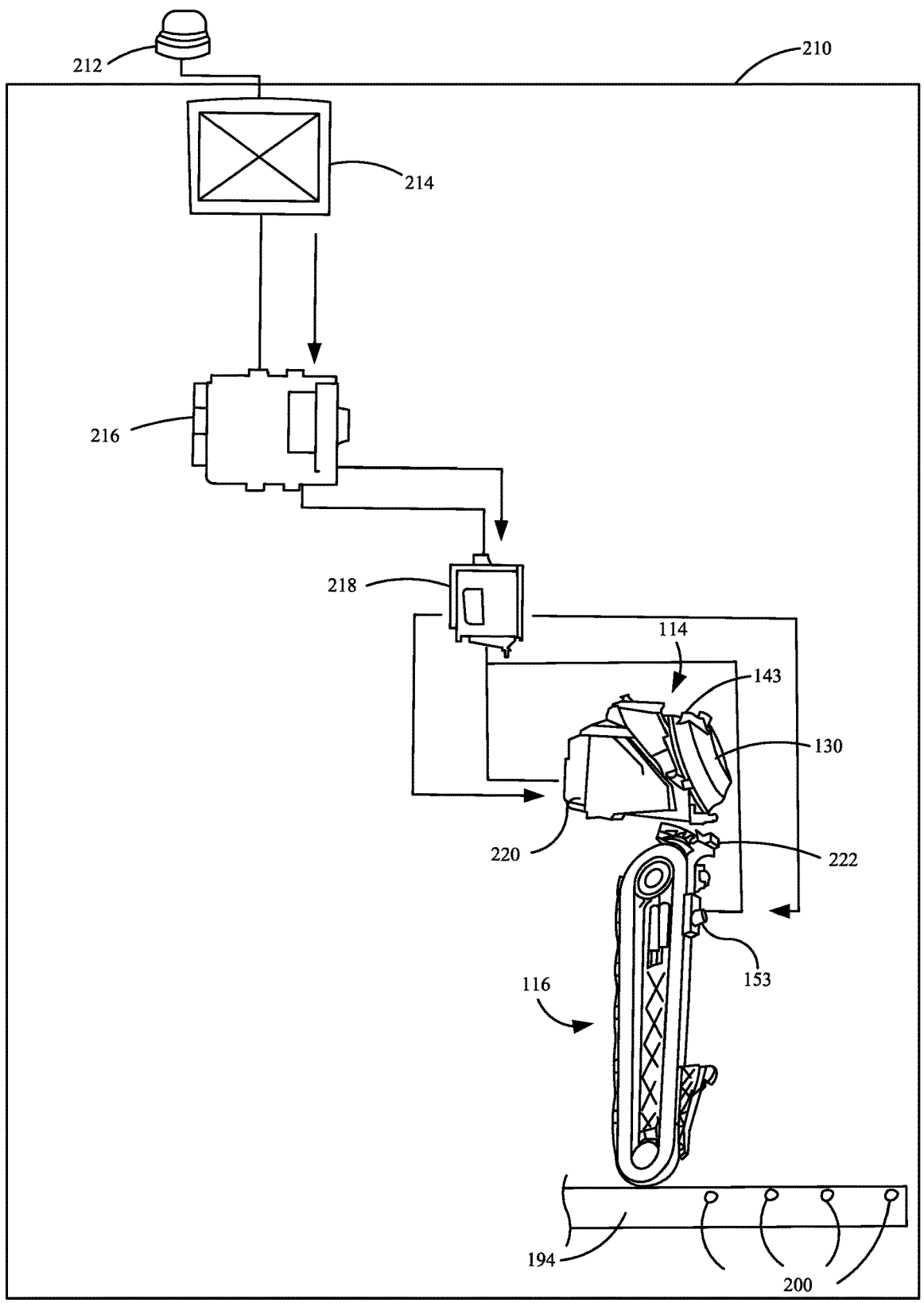
FIG. 5 is a partial schematic, partial pictorial illustration of a plurality of different controllers and actuators in a row unit, such as that described above with respect to FIGS. 2-4.

FIG. 5 shows a partial pictorial, partial schematic view of a control system architecture 210. Some of the items in architecture 210 are similar to those shown in previous FIGS., and they are similarly, numbered. Architecture 210 includes a positioning system, such as GPS receiver 212, and a display control system 214 that includes a display controller, and a user interface mechanism, such as a display. The display may be a touch sensitive display or another type of display that displays actuatable links, buttons, etc., that can be actuated by a touch gesture, a point and click device, or by another device. In the example shown in FIG. 5, the display control system 214 receives a GPS signal, indicative of sensed coordinates, and can provide command signals to, and receive information from, an intermediate controller 216.

In one example, the intermediate controller is a master controller that communicates with a plurality of additional controllers, such as row unit controllers (also referred to herein as ultimate control systems or actuators) 218. Row unit controllers 218 illustratively control the actuator, or motor 220 that drives metering system 114, as well as the actuator or motor 222 that drives seed delivery system 116. There may be a plurality of different intermediate controllers 216 corresponding to the display control system 214, each communicating with a plurality of row unit controllers 218. One of each is shown for example only.

By way of explanation, the various delays in the system, it is assumed that position detection system 212 is a GPS receiver that receives GPS coordinates and provides them to display control system 214. Based upon the coordinates representing the current location of the machine, and one or more maps indicating where to plant, display controller 214 may provide section control signals to the various intermediate controllers 216. In one example, the various intermediate controllers 216 control a plurality of row unit controllers 218, which control row units in one or more different sections of the planter. Therefore, display control system 214 can generate section control signals and provide them to the intermediate controllers 216. The intermediate controllers 216 transcribe those section control signals to identify individual row units that are to be enabled or disabled based upon the section control signals. Intermediate controllers 216 provide the row unit enable or disable control signals to row unit controllers 218. Row unit controllers 218, in turn, control the actuators to perform the row unit enable or disable operation. Therefore, row unit controller 218 can control the seed meter motor 220 that controls rotation of seed metering system 114. Row unit controller 218 can also control the brush belt motor 222 that causes rotation of the seed delivery system 116.

This type of processing includes a plurality of different types of delays. For instance, there are delays introduced due to the communication of information between the components. Also, the display control system 214 introduces a processing delay that includes the amount of time it needs to identify which section control commands to generate. Intermediate controller 216 introduces a translation delay in translating the section command into individual row unit commands. There is also an actuator delay which is introduced by actuators 220 and 222. That is, when row unit controller 218 applies an enable or disable signal to actuators 220 and/or 222, there is a delay between receipt of that signal, and the actuation operation that is performed. By way of example, when row unit controller 218 provides a signal to motor 222 to begin rotating, there is an actuator delay between when that signal is applied to motor 222, and when the motor actually begins rotating the brush belt in delivery system 116. There is also a delay introduced by the travel distance that the particular seed 200 being planted must travel after the delivery system 116 begins to rotate, and before the seed reaches its final resting position in furrow 194.

There are similar delays in sending messages in the opposite direction. For instance, there is a delay between when seed sensor 153 senses the presence of a seed in seed delivery system 116, and when row unit controller 218 provides that message to intermediate controller 216. Intermediate controller 216 then receives that message and determines a state of the various sections on the planter. For instance, if the seed sensor 153 is pulsing, indicating the presence of seeds, then that means that the row unit is functioning (or planting) and thus its status is "on". Intermediate controller 216 aggregates the signals from a plurality of row unit controllers 218 to determine the status of the entire section. It then provides that information, and an indication of the seed sensor signals, to display control system 214. This type of processing introduces a delay as well.

Display processing system 214 then calculates where to display the presence of the detected seed on the display mechanism, and then controls the display mechanism to do so. This introduces an additional delay.

The present description thus proceeds with respect to a system in which all of the various controllers in architecture 210 are synchronized to a common time base. Then, when a detector detects the presence of a variable (e.g., when GPS receiver 212 detects GPS coordinates), a timestamp corresponding to the time when that detection is made is appended to the sensor data. That timestamp can then be used by display control system 214 in identifying a next action that needs to be taken. Display controller 214 can then estimate a future time, and calculate a future timestamp, indicating a future time when the identified action is to be taken, based upon the GPS signal and its corresponding timestamp. Thus, regardless of the delays introduced between display control system 214 generating the command signal, and that command actually being carried out by actuators 220 and 222, those operations will be carried out accurately with respect to time and location.

The same is true in the reverse direction. When row unit controller 218 receives a seed sensor signal from seed sensor 153 indicating the presence of a seed, it applies a timestamp to that signal, indicative of the time when that signal was detected or received, and provides it to intermediate controller 216. Intermediate controller 216 can then perform its processing and provide the processed results, along with the timestamps, to display control system 214. Display control system 214 then knows when the seed sensor detected the seed, regardless of the delay introduced in the meantime.

Figure 6:
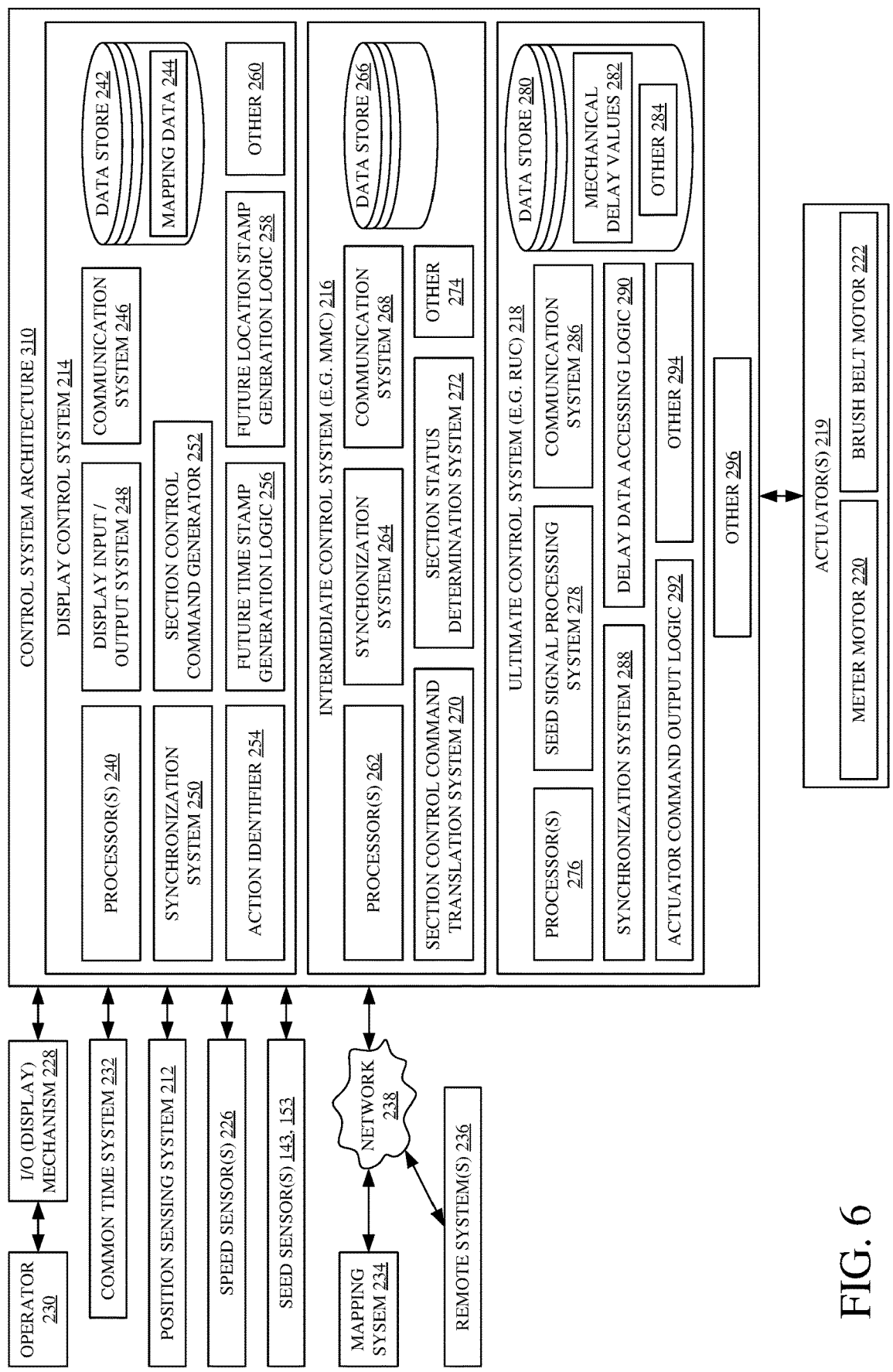
FIG. 6 is a block diagram showing one example of a control system that utilizes the controllers and actuators illustrated in FIG. 5.

FIG. 6 is a block diagram showing one example of the control system architecture 210, in more detail. Some items are similar to those shown in previous FIGS., and they are similarly numbered. In the example shown in FIG. 6, control system architecture 210 is shown not only connected to actuators 219 and positioning system 212 and seed sensors 143, 153, but it is shown also receiving an input from a speed sensor 226. Speed sensor 226 can be a component that derives the speed of the agricultural machine from the position signals generated by position sensing system 212, or it can be a ground speed sensor that senses ground speed by sensing axel rotation speed or other variables indicative of ground speed.

FIG. 6 also shows that control system architecture 210 is connected to input/output (I/O) (display) mechanism 228. Mechanism 228 can be any of a wide variety of different types of I/O mechanisms including visual, audio and haptic mechanisms. It can output information to an operator 230, and receive information from an operator 230. Therefore, in one example, display control system 214 can provide map display outputs to mechanism 228 to display an indication of where seeds have been planted by the machine, as it operates. Also, an operator 230 can provide inputs (such as to change a prescribed seed rate, etc.), through mechanism 228.

FIG. 6 also shows that control system architecture 210 can be connected to a common time system 232. The common time system 232 can illustratively be a clock or another type of timing system that generates a timing output. It will be noted that system 232 can be a clock that is internal to one of the control systems or controllers, or it can be an external clock. In one example, and as is described later in the application, display control system 214, intermediate control system 216 and ultimate control system 218 are all synchronized to that common time system 232.

It should also be noted that each of the various sensors (position sensing system 212, seed sensors 143, 153 and speed sensors 226 and/or others) can be coupled to common time system 232 so that they can generate their own timestamps along with the sensor signals that they provide. In another example, however, the sensors simply provide sensor signals indicative of the sensed variables to control system architecture 210, and architecture 210 generates the timestamps indicative of the times when those signals were received.

FIG. 6 also shows that, in one example, control system architecture 210 can be connected to an external mapping system 234, and/or one or more external or remote computing systems 236. Mapping system 234 can be accessed by control system architecture 210 to generate maps indicative of seed locations or other maps, or it can be accessed to obtain maps, prescriptions, etc. Those maps can include prescriptive maps showing where seeds or material are to be applied to a field, seed rate maps, or other maps.

Remote computing systems 236 can be farm manager computing systems, vendor computing systems, or a wide variety of other remote computing systems.

Control system architecture 210 can be connected to system 234, systems 236 or other systems over a network 238. Network 238 can thus be a local area network, a wide area network, a near field communication network, a cellular communication network, or any of a wide variety of other networks or combinations of networks.

Before describing the overall operation of architecture 210, a brief description of some of the items in architecture 210, and their operation, will first be described. In the example shown in FIG. 6, display control system 214 includes one or more processors 240, data store 242 (that can include mapping data 244) communication system 246, display input/output system 248, synchronization system 250, section control command generator 252, action identifier 254, future timestamp generation logic 256, future location stamp generation logic 258, and it can include a wide variety of other items 260 as well. Intermediate control system 216 includes one or more processors 262, synchronization system 264, data store 266, communication system 268, section control command translation system 270, section status determination system 272, and it can include other items 274. The ultimate control system (or row unit controller) 218 illustratively includes one or more processors 276, seed signal processing system 278, data store 280 (which can include mechanical delay values 282 and other items 284), communication system 286, synchronization system 288, delay data accessing logic 290, actuator command output logic 292, and it can include other items 294. Control system architecture 210 can include other items 296 as well.

Display input/output system 248 illustratively generates control signals to control I/O (display) mechanism 228. It can do this, as is described below, based upon seed signals from seed sensors, along with time and/or location stamps to display the location of the seeds, in near real-time, to operator 230. System 248 can also receive operator inputs through mechanism 228 or other input mechanism.

Synchronization system 250 illustratively synchronizes the internal timing of data display control system 214 with the common time system 232. Position sensing system 212 senses a position of the machine and provides a position signal to display control system 214. Action identifier 254 identifies the next action to be taken, or commanded, on the machine, and future timestamp generation logic 256 generates a future timestamp indicating when that action is to be taken. Thus, future timestamp generation system 256 can receive an input from speed sensor 226 indicating the ground speed of the machine. Knowing the ground speed of the machine, and knowing when and where the next action is to be taken, it can calculate a future time when the action should be taken so it is taken at the proper location. By way of example, assume that the machine is traveling 10 miles per hour and the right half of the machine is approaching an area where the field has already been planted. In that case, the action to be taken is to turn off the planting actuators on the sections that constitute the right half of the planting machine. By knowing the location of where the field has already been planted, and the speed of the machine, as well as the current position of the machine at a particular time, future timestamp generation logic 256 generates a timestamp indicating a future time when the row units on the right half of the machine are to be turned off. Section control command generator 252 then generates a section control command to implement this. The section control command identifies which sections of the machine are to be turned off, and it will include the future timestamp.

Communication system 246 can be configured to communicate over a bus, wirelessly, or over a wide variety of different types of networks.

Figure 10:
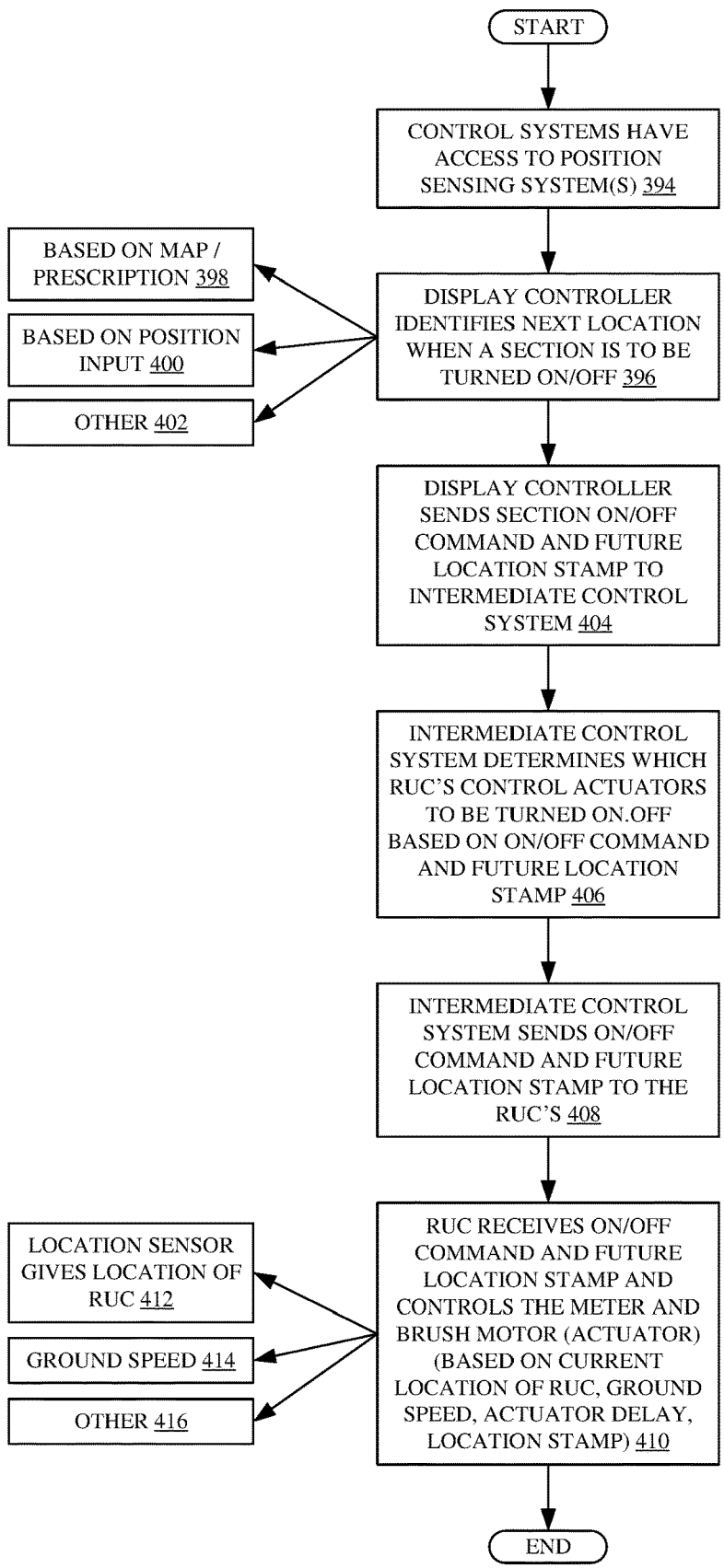
FIG. 10 is a flow diagram showing one example of the architecture illustrated in FIG. 6 in performing section on/off control using a location stamp.
Figure 11:
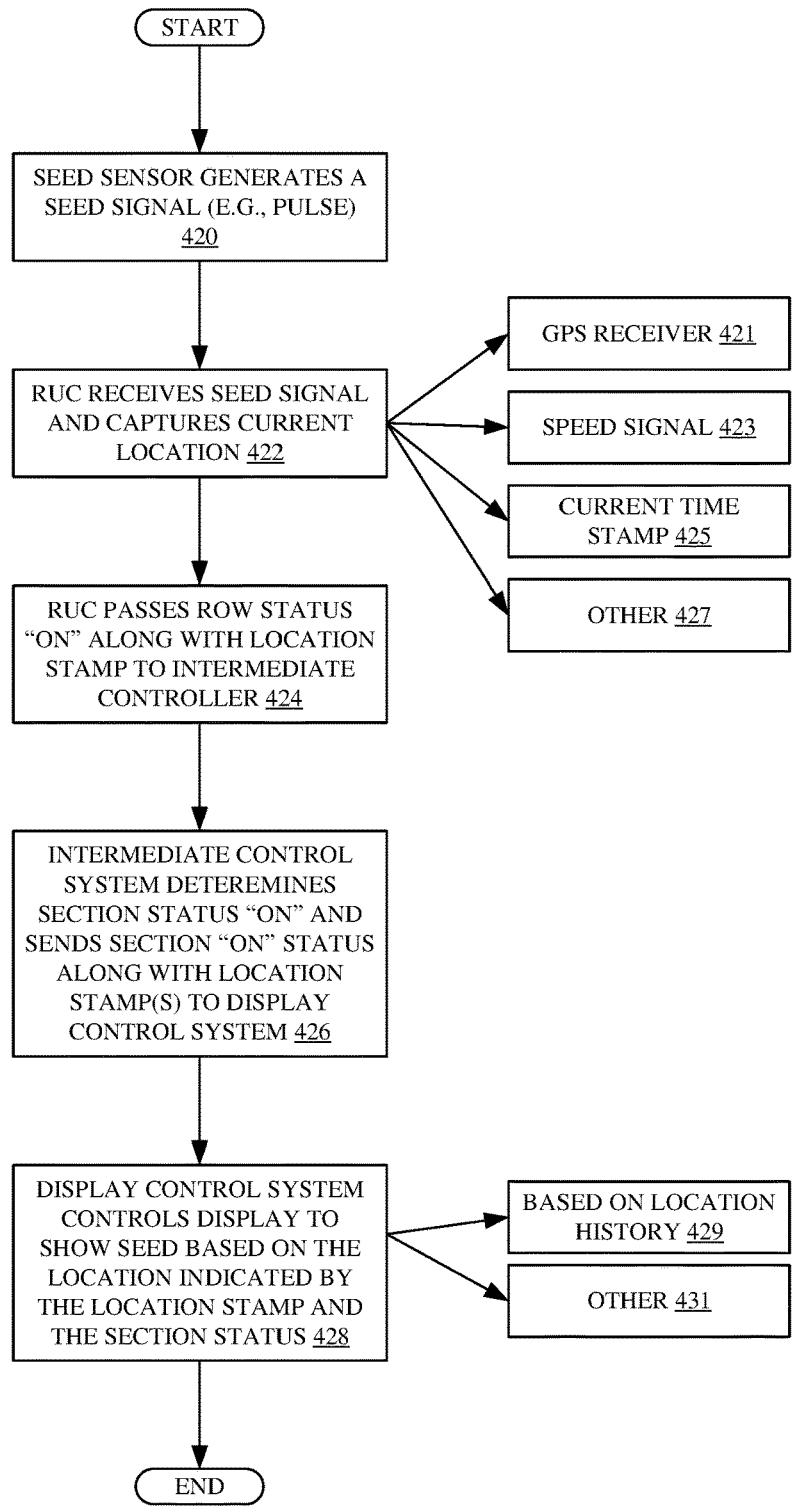
FIG. 11 is a flow diagram showing one example of the operation of the control system illustrated in FIG. 6 in performing seed mapping based on a location stamp.

Future location stamp generation logic 258, as is described in greater detail below with respect to FIGS. 10 and 11, is used to generate a future location stamp indicating a location where the action is to be taken. For instance, instead of generating a future timestamp indicating a time where the action is to be taken, generation logic 258 generates a future location stamp indicative of the geographic location where the action is to be taken. In that example, each of the control systems 214, 216, and 218 will have access to the position signal generated by position sensing system 212 so that they consistently know a current position of the machine. In another example, the different control systems may have access to different position sensing systems (e.g., they may have access to different GPS receivers, etc.) Then, regardless of any delay introduced in the system, they can take actions when the machine is at a particular location.

Intermediate control system 216 also includes a synchronization system 264 which can be used to synchronize system 216 to the common time system 232. Again, it will be noted that the common time system 232 may be a clock or other timing system internal to a different system, or it may be an external common time system to which all controllers (or those that need it) have access.

Section control command translation system 270 illustratively receives the section control commands from display control system 214 that commands particular sections to be turned on or off. It then translates those commands into commands for individual row units.

Communication system 268 can be used to communicate over a bus, wirelessly, or over a wide variety of different types of networks.

Section status determination system 272 is used when a signal is received from ultimate control system 218 indicating that a seed sensor 153 is pulsing. When that occurs, section status determination system 272 can generate an output indicating that the corresponding section has a status of "on". When the seed sensors on a particular section are not pulsing, this indicates that the section is "off". The ultimate control system (or row unit control system) 218 illustratively includes synchronization system 288 that synchronizes system 218 to the common time system 232. Delay data accessing logic 290 accesses mechanical delay values 282 that are indicative of the mechanical or other actuator delays that are introduced when a control signal is applied to an actuator but there is a delay in the actuator before that action is taken. Actuator command output logic 292 can receive the row unit control signals from system 270 in intermediate control system 216 and generate actuator command signals that are applied to actuators 219 to take the actions. For instance, when the future timestamp indicates that meter motor 220 is to be started in one second, but delay data accessing logic 290 has identified a 500 millisecond actuator delay from mechanical delay values 282, then actuator command output logic 292 waits until the present time (indicated by synchronization system 288) is equivalent to the future timestamp less the actuator delay. At that point, logic 292 generates an output signal to turn meter motor 220 on. This means that the motor will turn on at the correct time, even given the inherent delay in actuator 220.

Seed signal processing system 278 receives seed sensor signals from one of sensors 143, 153, and generates an output, along with a timestamp (or geographic location) corresponding to that seed signal. It provides the seed signal, and the corresponding time or location stamp, to intermediate control system 216, where section status determination system 272 determines the section status and forwards the section status and the seed signal value, along with the geographic location or timestamp, to display control system 214. The display input/output system 248 then generates an output to display mechanism 228 so that the seeds are displayed at the correct location on the mapping output on mechanism 228, for operator 230.

Figure 7:
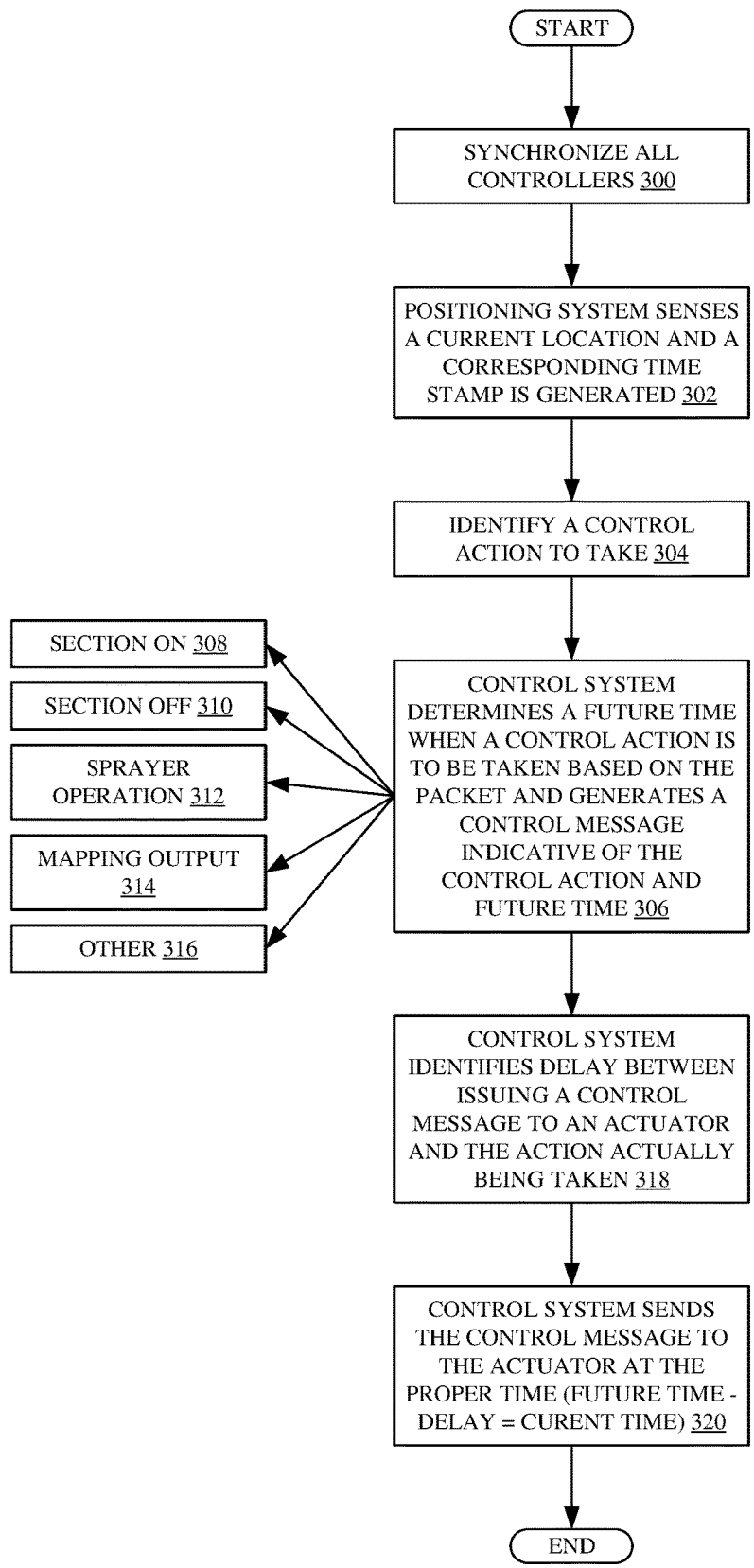
FIG. 7 is a flow diagram illustrating one example of the overall operation of the control system shown in FIG. 6, in performing a planting operation using a timestamp.

FIG. 7 is a flow diagram illustrating one example of the overall operation of control system architecture 210 in performing a control operation to control one or more of the actuators 219 to perform an operation. In one example, the synchronization systems 250, 264 and 288 synchronize with the common time system 232. This is indicated by block 300. The synchronization systems can synchronize internal clocks in the various control systems 214, 216, and 218 to the common time system 232.

At some point, positioning system 212 senses a current location and it can generate a position output indicative of the sensed location and provide that output to control system architecture 210. In one example, positioning system 212 has access to the common time system 232 so that system 212 can also generate a timestamp corresponding to the sensed location. In that example, it sends the timestamp along with the sensed location. In another example, however, positioning system 212 simply sends the sensed location to control system architecture 210 and one of the control systems in architecture 210 generates a timestamp indicative of when the sensed location was received. For purposes of the present description, it is assumed that position sensing system 212 provides a location indication to display control system 214. The timing system (e.g., synchronization system 250) in display control system 214 generates a timestamp corresponding to the location indication. Receiving the position indication, and generating a corresponding timestamp is indicated by block 302.

Action identifier 254 then identifies a control action to be taken. This is indicated by block 304. For example, it may be running a control algorithm which is considering seed application rates based on mapping information that shows where the seeds are to be planted, and the seed rate. Thus, action identifier 254 may identify that the planter is approaching a boundary of an already-planted area, where one of the planter sections is to be turned off. Action identifier 254 can identify a wide variety of other actions as well.

Future timestamp generation logic 256 then generates a future timestamp indicative of a future time when the control action (the section off action) is to be taken. It can do this based on the packet indicating the location indication and its corresponding timestamp. For instance, when action identifier 254 identifies that a section control command is to be issued turning off a section of the planter, then future timestamp generation logic 256 identifies the current location of the planter (as indicated by the location identification with its corresponding timestamp) and determines when, in the future, the identified section of the planter is to be turned off. It then generates a control message indicative of the control action (the section off command) and the future timestamp that identifies when that action is to occur. This is indicated by block 306. Of course, the command can be a command to perform a wide variety of other control actions, such as a seed placement (or section on) command 308, a section off command 310, a sprayer on or off command 312, or a mapping output command 314. It can command a wide variety of other operations or actions 316 as well.

Control system architecture 210 then identifies any delay between issuing a control message to an actuator and the action actually being taken. For instance, there may be a delay between issuing a meter motor on command to motor 220 and the motor beginning to turn. The same may be true of brush belt motor 222. In the example illustrated in FIG. 6, the ultimate control system (or row unit controller) 218 uses delay data accessing logic 290 to access machine/mechanical delay values 282 in data store 280. These values indicate the actuator delays. They may be downloaded from a remote system 236 over network 238, or determined during a calibration process, or otherwise, and stored in data store 280. Logic 290 provides this information to actuator command output logic 292. This is indicated by block 318 in the flow diagram of FIG. 7.

Actuator command output logic 292 then uses the control signal and the corresponding future timestamp to determine when to issue the actuator command to one of the actuators 219. In one example, it subtracts the actuator delay from the future time in the future timestamp and, when the resultant time is a current time, then it issues the command to actuator 219. In this way, it will issue it in sufficient time before the action is to be taken by the actuator, to accommodate for the actuator delay. Having the actuator command output logic 292 send the control message to the actuator at the proper time (by determining when the current time is equal to the future time minus the actuator delay) is indicated by block 320.

Figure 8A:
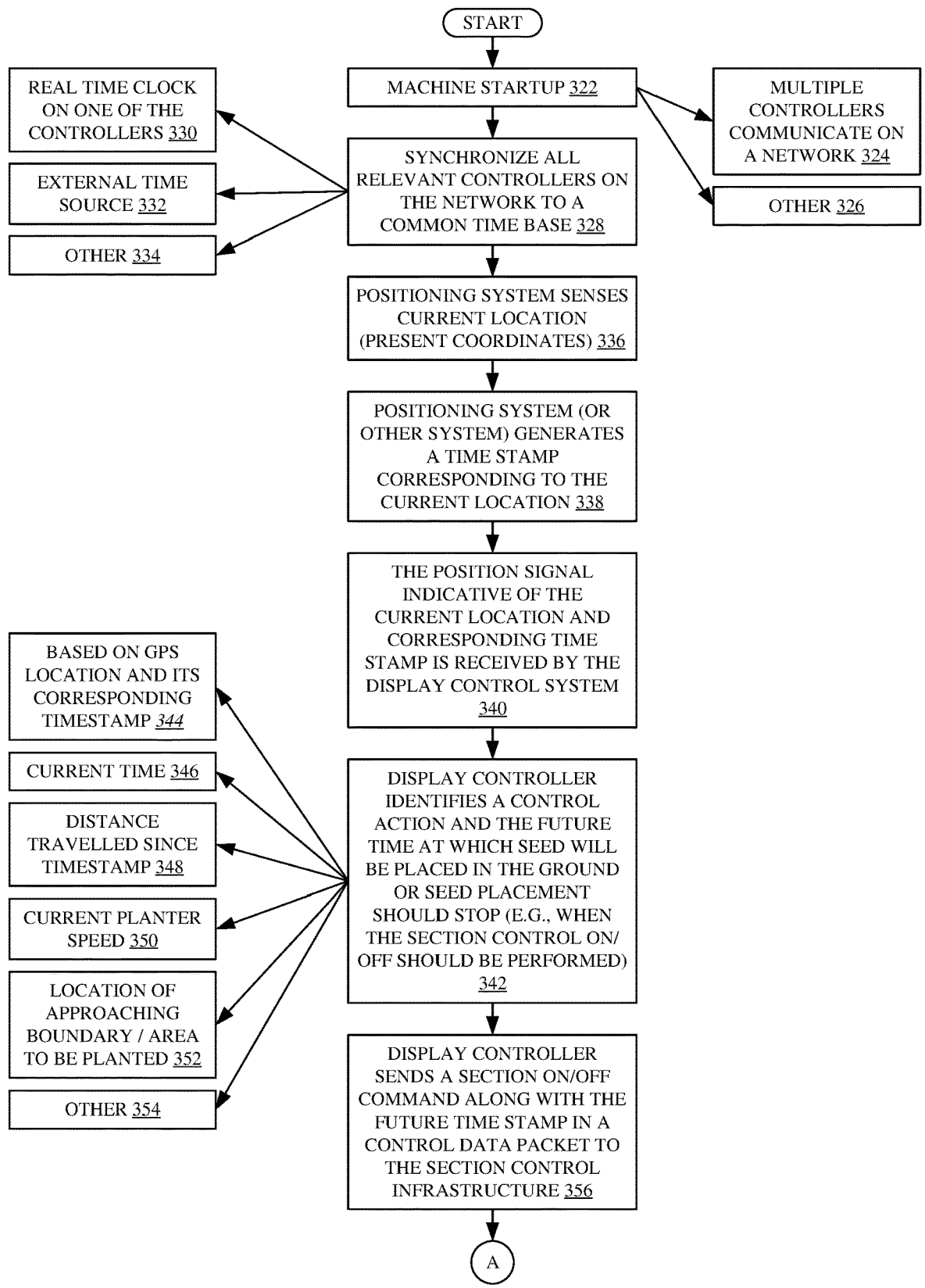
FIGS. 8A and 8B illustrate a flow diagram showing one example of the operation of the control system shown in FIG. 6 in performing section control using a timestamp.
Figure 8B:
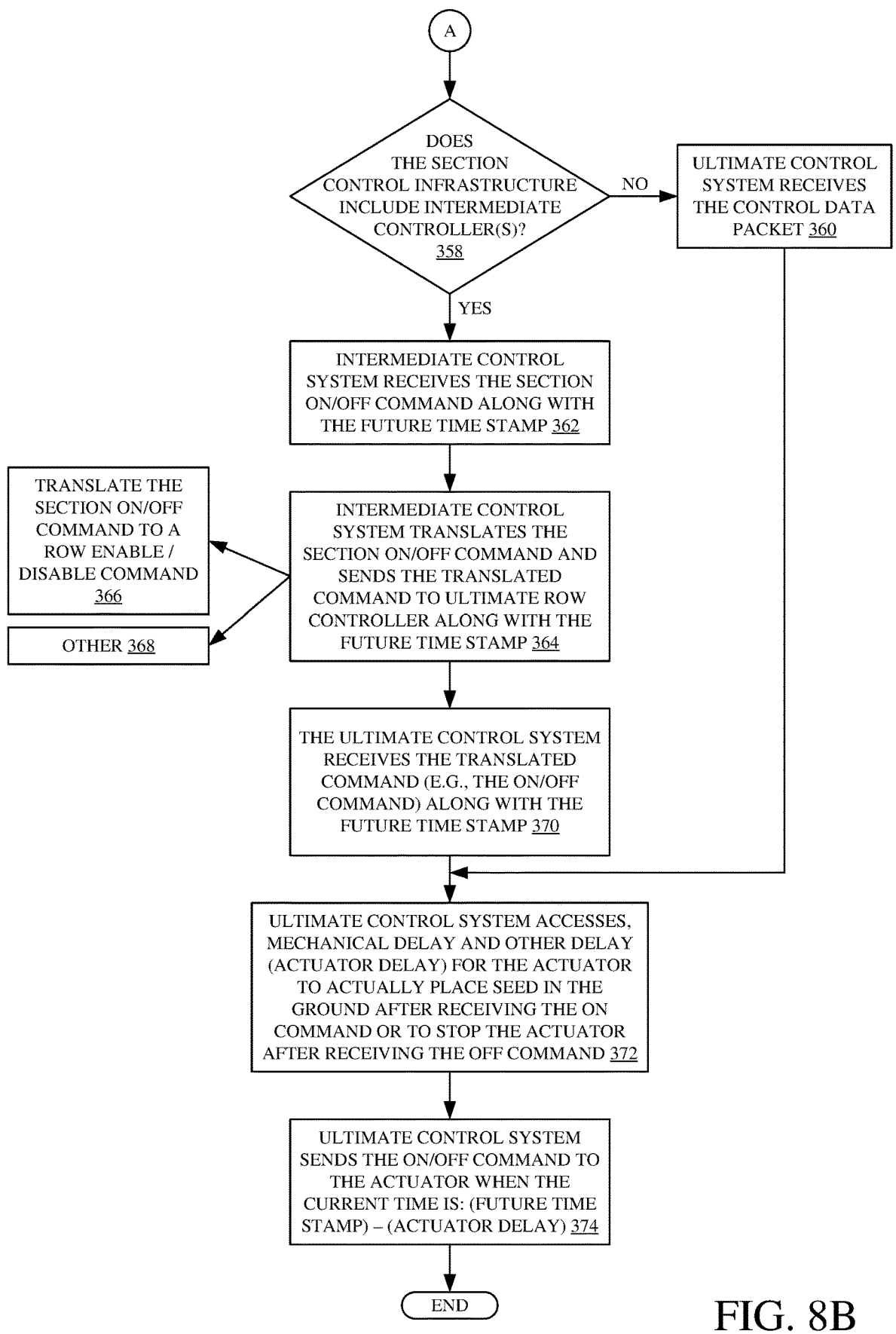

FIGS. 8A and 8B illustrate a flow diagram showing one example of the operation of control system architecture 210 (shown in FIG. 6) in generating a section control off-to-on or on-to-off command. It is first assumed, at machine startup, that there are multiple controllers in control system architecture 210. In the example discussed herein, the multiple controllers are display control system 214, the intermediate control system (or meter master controller) 216 and the ultimate control system (or row unit controller) 218. Machine startup is indicated by block 322, and having multiple controllers communicating over a network is indicated by block 324. The control system architecture can have other configurations as well, and this is indicated by block 326.

All of the synchronization systems 250, 264 and 288 then synchronize their corresponding control systems with the common time system 232. This is indicated by block 328. As discussed above, the common time system 232 can be a real-time clock on one of the control systems or processors. This is indicated by block 330. It can be an external time source as indicated by block 332, or it can be a wide variety of other timing systems, as indicated by block 334.

Position sensing system 212 then senses a current location (or the present coordinates) of the position sensing system 212. For instance, where the position sensing system is a GPS receiver, it senses its current coordinates. This is indicated by block 336.

The position sensing system 212 (or the control system that receives it) generates a timestamp corresponding to the current location. This is indicated by block 338. At some point, the location signal, indicative of the current location, and the corresponding timestamp, are received by the display control system 214. This is indicated by block 340 in the flow diagram of FIG. 8.

Action identifier 254 then identifies that the next control action is to be a section or section off control action. Future timestamp generation logic 256 then identifies the future time at which seed placements should begin or seed placement should stop (e.g., the future time when the section control on or section control off command action should be taken). This is indicated by block 342 in the flow diagram of FIG. 8. In one example, the future timestamp generation logic 256 generates the future timestamp based on the GPS location and its corresponding timestamp. This is indicated by block 344. It can also be based on a present time as indicated by the synchronized common time system 232. This is indicated by block 346. Future timestamp generation logic 256 also illustratively considers the distance traveled since the timestamp corresponding to the GPS location. Thus, it may consider the planter ground speed. This is indicated by blocks 348 and 350. Further, the future timestamp can be based upon the location of the approaching boundary or area where the section control command is to be executed. This is indicated by block 352. The future timestamp can be based on these and/or a wide variety of other items, and this is indicated by block 354.

The display controller then uses communication system 246 to send the section on/off command along with a future timestamp in a controlled data packet to the section control infrastructure. In the example illustrated in FIG. 6, the section control infrastructure includes the intermediate control system 216 and the ultimate control systems (or row until controllers) 218. Sending the section command to the intermediate control system 216 is indicated by block 356 in the flow diagram of FIG. 8. If there are no intermediate controllers in the section control infrastructure, as determined at block 358, then the ultimate control system 218 receives the control data packet. This is indicated by block 360.

However, continuing with the present example in which intermediate control system 216 is used, then the intermediate control system receives the section on/off command along with a future timestamp. This is indicated by block 362. The section control command translation system 270, in the intermediate control system 216, translates the section on/off command and sends the translated command (along with the future timestamp) to the ultimate row control system 218. This is indicated by block 364. In one example, translation system 270 translates the section on/off command into individual row enable/disable commands that can be implemented by the ultimate control system (or row unit controllers) 218. This is indicated by block 366. The translation can include other items as well, and this is indicated by block 368.

The ultimate control system 218 receives the translated command (e.g., the row on/off command or row enable/disable command) along with the future timestamp. This is indicated by block 370. Delay data accessing logic 290 then accesses the mechanical delay values 382 to identify a mechanical delay for the particular actuator or actuators 219 being actuated, for the particular operation (e.g., enable or disable). This is indicated by block 372. The ultimate control system then sends the on/off (or enable/disable) command to the actuators 219 when the current time is equal to the future timestamp minus the actuator delay. This is indicated by block 374.

It can thus be seen that the control system architecture 210 can perform control operations at the correct time, regardless of the delays involved in the architecture. This is at least partially because all of the controllers are synchronized to a common time base, and because the sensor signals and control signals include timestamps.

Figure 9:
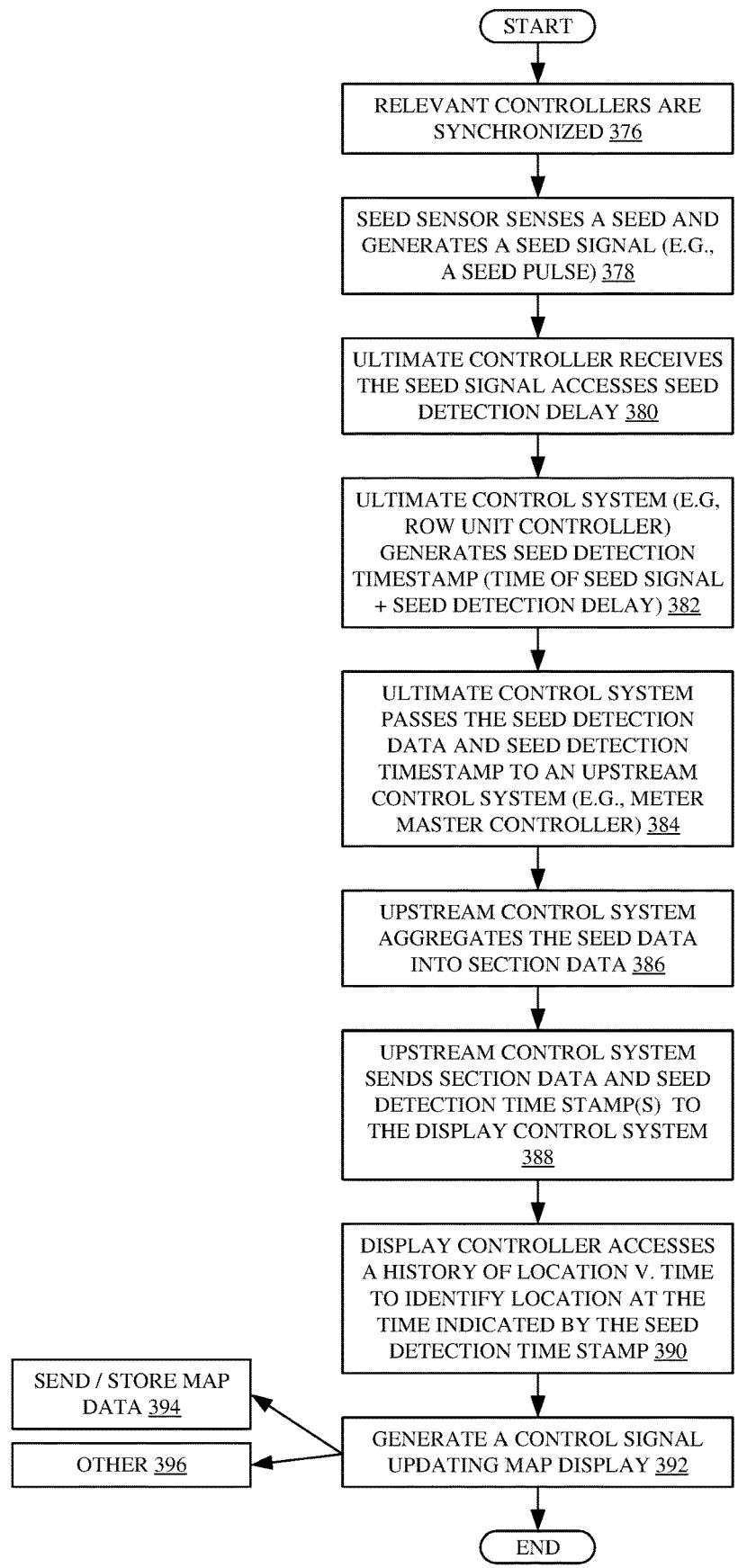
FIG. 9 is a flow diagram showing one example of the operation of the control system shown in FIG. 6 in performing a seed detection and mapping operation using a timestamp.

FIG. 9 is a flow diagram illustrating one example of the operation of control system architecture 200 during which one of seed sensors 143, 153 senses a seed and generates a seed signal indicative of the sensed seed. That information is provided to control system architecture 200 so that display control system 214 can generate a near real-time map display on mechanism 228 for operator 230.

It is first assumed, in the example described with respect to FIG. 9, that the relevant controllers (or control systems 214, 216 and 218) are synchronized to a common time base, as discussed above. This is indicated by block 376 in the flow diagram of FIG. 9.

For the purposes of the present example, assume that the seed sensor signal that is being processed is generated from seed sensor 153. At some point, seed sensor 153 senses a seed and generates a seed signal (such as a seed pulse). This is indicated by block 378. The seed signal processing system 278 in the row unit controller 218 receives the seed signal and accesses the mechanical delay values 282 that indicate the delay between seed sensor 153 sensing the seed and the seed actually reaching its final location in the ground. Receiving the seed signal and accessing the seed detection delay values (or mechanical delay values) is indicated by block 380.

The ultimate control system (e.g., row unit controller) 218 then uses seed signal processing system 278 to generate a seed detection timestamp which is equal to the time that the seed signal was generated plus the seed detection delay. This is indicated by block 382. This will provide an indication of the time when the seed actually reached its final location in the ground.

The communication system 286 in ultimate control system 218 then passes the seed detection data and the seed detection timestamp to the intermediate control system 216. This is indicated by block 384. The intermediate control system 218 can aggregate the seed data from multiple row unit controllers (intermediate controllers) 216 into section data, and sends the section data and seed detection timestamps to the display control system 214. This is indicated by blocks 386 and 288 in the flow diagram of FIG. 9.

In one example, the intermediate control system 216 aggregates seed signals that are received from a plurality of different row units corresponding to a particular section of the planter, and sends that data, along with the corresponding timestamps, as a data packet to display control system 214. In another example, the seed data generated from the individual seed sensors on individual row units, and their corresponding timestamps, can be sent to the display control system 214 separately from one another. These and other communication configurations are contemplated herein.

Also, in one example, data store 242 stores mapping data 244 which includes a history of location coordinates versus time. Display input/output system 248 thus accesses this information to identify a location at the time indicated by the timestamp on the seed detection signal. This is indicated by block 390. Display input/output system 248 then generates a control signal updating the map display on the display mechanism 228 showing the seed location represented by the seed detection signal. This is indicated by block 392. It can store that information onboard, or send it to mapping system 244 over network 238. This is indicated by block 394. Display control system 214 can perform other operations based upon the seed detection signal and the corresponding timestamp as well. This is indicated by block 396.

FIG. 10 is a flow diagram showing one example of the operation of the control system architecture 210, shown in FIG. 6, in which an on/off command is to be issued to actuators 219. Unlike the examples shown in some of the previous FIGS., the discussion with respect to FIG. 10 assumes that each of the control systems 214, 216, and 218 have access to position sensing system 212, so that, whenever they receive a sensor signal or generate a command signal, they can attach a position stamp indicating the coordinates of the machine when the sensor signal was received, or the control command was generated.

Assume, for instance, that a section off control command is to be issued at a certain geographic position on a field, based upon a mapping input, or a user input through the user interface display, or based on other criteria. In that case, the display control system 214 can generate a section control command to command this operation, and append to it a future geographic position stamp indicating a future location of the machine where the command is to be executed. That command can then be sent through intermediate control system 216 to the ultimate control system 218 which, having access to position sensing system 212, can monitor the position of the machine and generate a control signal to execute the desired action, when the machine reaches the desired location indicated by the future geographic location stamp. Ultimate control system 218, in doing this, can also consider the actuator delays so that it applies the command signal to the actuators 219 slightly ahead of time, so that the actuators actually take the commanded action when they are at the desired location. FIG. 10 describes this in more detail.

It is first assumed that all of the control systems have access to the position sensing system 212. This is indicated by block 394 in the flow diagram of FIG. 10. At some point, action identifier 254 identifies a control action that needs to be taken. For purposes of the present description, the control action is that a section of the planter is to be turned on or off at a particular location. This is indicated by block 396. This may be based upon a map or prescription input as indicated by block 398. It may be based on a current location input indicative of the current location of the machine, as indicated by block 400. It may be based on a wide variety of other inputs as well, and this is indicated by block 402.

Future location stamp generation logic 258 generates a future location stamp indicating the location where the commanded action is to be executed. Display control system 214 then forwards the section on/off command, and the future location stamp, to intermediate control system 216. This is indicated by block 404 in the flow diagram of FIG. 10.

Section control command translation system 270 then determines which particular row units are relevant to the section on/off command. That is, it determines which row unit controllers 218 control the actuators 219 that are to be turned on or off based upon the section on/off command. This is indicated by block 406.

Intermediate control system 216 then generates a row unit enable/disable signal for those row units, and sends it, along with the future location stamp, to the relevant row unit controllers. This is indicated by block 408 in the flow diagram of FIG. 10.

The row unit controller 218 receives the on/off command and the future location stamp. Delay data accessing logic 290 accesses the actuator delay values 282, and actuator command output logic 292 monitors the current location based on an input from position sensing system 212. It also receives a speed sensor signal from speed sensor 226 indicating the ground speed of the machine. Actuator command output logic 292 then generates the actuator output command signals to control actuators 219 to perform the commanded operations at the desired location. It does this based on a current location of the row unit, as indicated by the signal from the position sensing system 212. It also does this based upon the current ground speed indicated by speed sensors 226, and based on the actuator delays indicated by the actuator delay values 282. When the row unit is close enough to the desired location that the actuator command output logic 292 can issue a command signal to the actuators, and, after the actuator delays, the commanded action will take place at the desired location indicated by the future location stamp, then actuator command output logic 292 generates the actuator command signal and applies it to actuators 219. This is indicated by block 410. As mentioned, the row unit controller 218 has access to the position information output by position sensing system 212. This is indicated by block 412. It also has access to the speed signal output by speed sensor 226. This is indicated by block 414. It can have access to other items as well, as indicated by block 416.

FIG. 11 is a flow diagram illustrating one example of the operation of control system architecture 210 in receiving a seed sensor signal and providing it to display input/output system 248 so that the near real-time map output can be generated on mechanism 228 for operator 230. It is similar to that described above with respect to FIG. 9, except that, instead of using a timestamp on the seed detection signal, the example discussed with respect to FIG. 11 uses a location stamp.

At some point, seed sensor 153 generates a seed signal (e.g., a seed pulse) indicating the presence of a seed. This is indicated by block 420 in the flow diagram of FIG. 11. This signal is provided to the row unit controller 218 where seed signal processing system 278 captures a current location from position sensing system 212. This is indicated by block 422 in the flow diagram of FIG. 11. It can receive the location from a GPS receiver (as indicate by block 421). It can also receive a speed signal from speed sensor 226 (as indicated by block 423), and a current time stamp (as indicated by block 425) and/or other items (as indicated by block 427). The row unit controller 218 then passes the row unit status of "on" (because a seed pulse was received, indicating that the row unit is planting) along with the location stamp indicative of the location of the row unit when that seed signal was received, to intermediate control system 216. This is indicated by block 424.

Section status determination system 272 then determines the section status as "on", based upon the seed signals received from the row unit controllers in the corresponding section. It sends the section "on" status, along with the location stamps (corresponding to the various seed signals that are being sent) to display control system 214. This is indicated by block 426. Display input/output system 248 generates control signals to control display mechanism 228 to show the seed location based upon the location indicated by the location stamp, and based on the section status indicated by the section status signal corresponding to the location stamp. This is indicated by block 428. It can also do this based on location history, as indicated by block 429 and/or other items, as indicated by block 431.

It can thus be seen that the seed location can be accurately mapped, in near real-time, on display mechanism 228, regardless of the various system delays. The seed signals are appended with a location stamp indicating the location where the seeds were detected. In one example, that location can be modified based upon any known delay between the seed detection signal and the seed actually reaching its final location in the ground. Thus, even if there is some inherent or other delay in providing the seed signal and location stamp to display input/output system 248, that delay does not affect the location stamp, and the seeds are thus accurately mapped.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
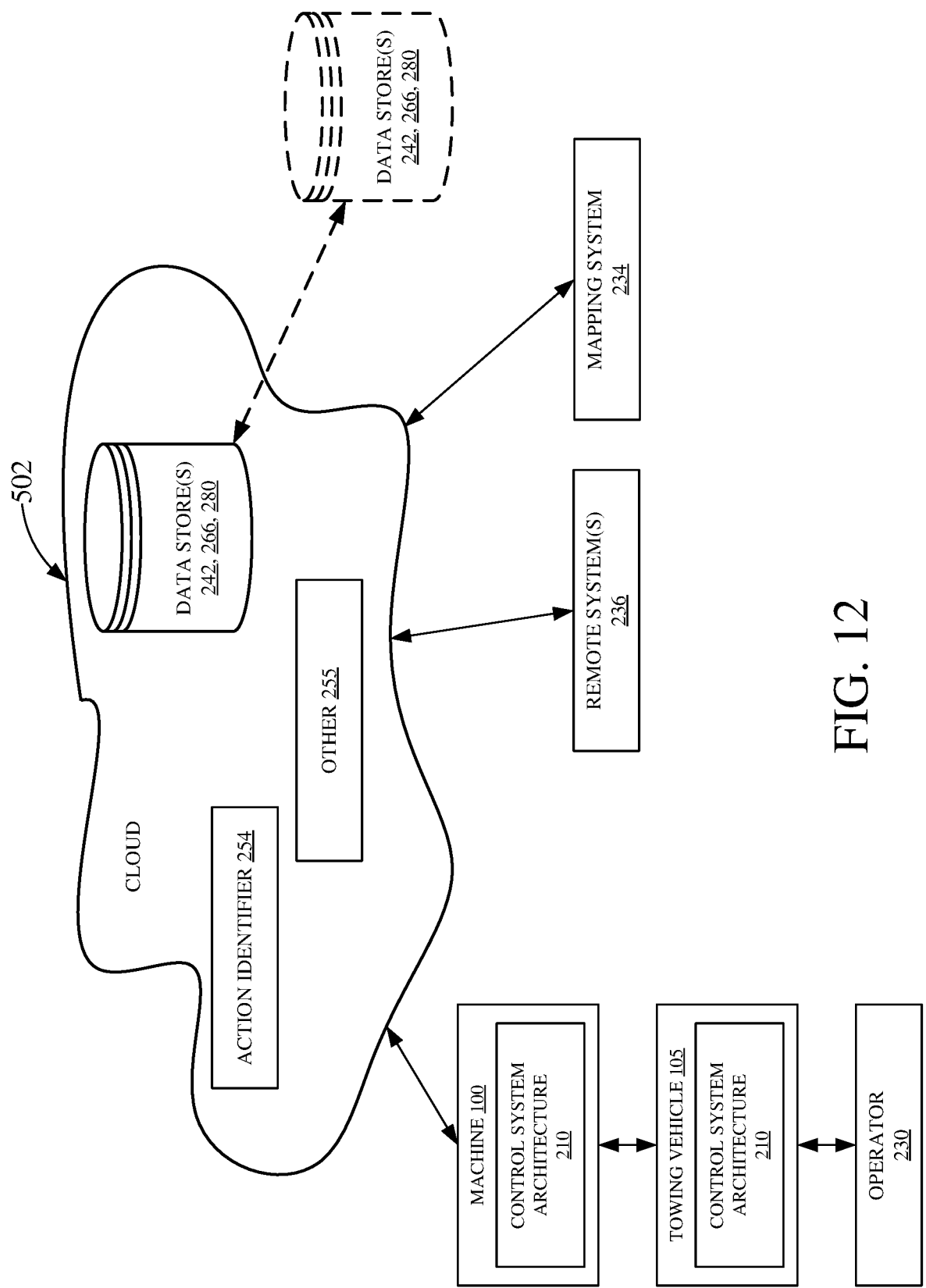
FIG. 12 is a block diagram showing one example of the control system illustrated in FIG. 6, deployed in a remote server architecture.

FIG. 12 is a block diagram of a planter and control architecture shown in previous FIGS., except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 12, some items are similar to those shown in previous FIGS., and they are similarly numbered. FIG. 12 specifically shows action identifier 254 and/or other items 502 from previous FIGS. can be located at a remote server location 502. Therefore, machine 100 or towing vehicle 105 can access those systems through remote server location 502.

FIG. 12 also depicts another example of a remote server architecture. FIG. 5 shows that it is also contemplated that some elements of previous FIGS. are disposed at remote server location 502 while others are not. By way of example, data stores 242, 266, 280 can be disposed at a location separate from location 502, and accessed through the remote server at location 502. Regardless of where they are located, they can be accessed directly by machines 100, 105, through a network (either a wide area network or a local area network), they can be hosted at a remote site by a service, or they can be provided as a service, or accessed by a connection service that resides in a remote location. All of these architectures are contemplated herein.

It will also be noted that the elements of the FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
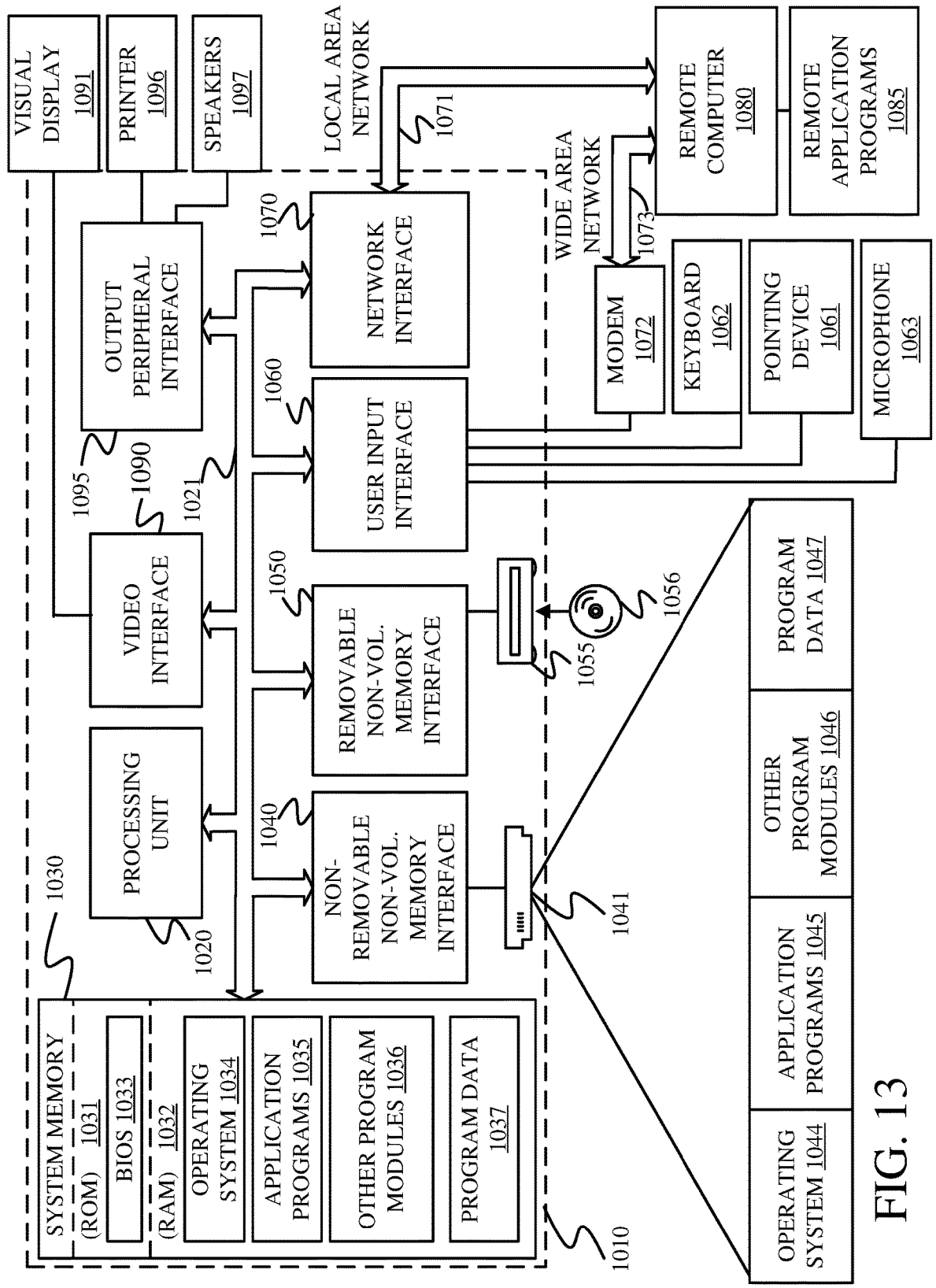
FIG. 13 is a block diagram showing one example of a computing environment that can be used in the architectures and control systems shown in the previous FIGS.

FIG. 13 is one example of a computing environment in which elements of previous FIGS., or parts of them, (for example) can be deployed. With reference to FIG. 13, an example system for implementing some embodiments includes a general-purpose computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a mobile agricultural machine, comprising:
    identifying a timing relationship between a first timing system a first control system and a second timing system in a second control system;
    sensing a geographic location of the agricultural machine;
    identifying a control action to perform based on the sensed geographic location;
    generating a time indicator indicative of a future time at which the control action is to be performed based on the timing relationship;
    sending a signal indicative of the control action and the time indicator to the second control system; and
    controlling an actuator of the mobile agricultural machine, with the second control system, to perform the control action based on the signal indicative of the control action and the time indicator.

2. The method of claim 1 wherein identifying a timing relationship comprises:
    comparing timing in the first timing system and timing in the second timing system to a common time base to obtain a timing comparison result; and
    identifying the timing relationship based on the timing comparison result.

3. The method of claim 1 wherein identifying a timing relationship comprises;
    synchronizing the first timing system and the second timing system to a common time base.

4. The method of claim 1 wherein identifying the timing relationship comprises:
    accessing the timing relationship from a data store.

5. The method of claim 1 wherein generating a time indicator comprises:
    obtaining an actuator latency corresponding, to the actuator performing the control action; and
    generating the time indicator based on the actuator latency.

6. The method of claim 5 wherein controlling the actuator comprises:
    detecting a current time; and
    controlling the actuator to perform the control action based on the current time and the time indicator.

7. The method of claim 1 wherein generating the time indicator comprises:
    identifying a geographic location where the control action is to be performed;
    receiving a speed indicator indicative of a rate of travel of the mobile agricultural machine;
    obtaining a synchronized current time signal indicative of a current time, synchronized to the common time base; and
    generating the time indicator based on the geographic location of the mobile agricultural machine, the rate of travel of the mobile agricultural machine, the location where the control action is to be performed, and the current time.

8. The method of claim 1 wherein sending a signal indicative of the control action and the time indicator to the second control system comprises:
    before sending the signal indicative of the control action and the time indicator to the second control system, sending the signal indicative of the control action and the time indicator to an intermediate control system;
    generating an actuator enable/disable command indicative of whether the actuator is to be enabled or disabled to perform the control action, at the intermediate control system, based on the signal indicative of the control action and the time indicator; and
    sending the actuator enable/disable command and the time indicator to the second control system, the second control system controlling the actuator based on the actuator enable/disable command and the time indicator.

9. The method of claim 8 wherein the agricultural machine comprises a planter and wherein the second control system comprises a row unit controller and wherein the first control system comprises a plurality of intermediate control systems, and wherein a plurality of row unit controllers correspond to each intermediate control system and wherein generating the actuator enable/disable command comprises:
    generating a row enable/disable signal indicative of whether each of the plurality of row unit controllers corresponding to the intermediate control system are enabled or disabled.

10. The method of claim 3 wherein the agricultural machine comprises a sprayer with actuatable spray nozzles and wherein controlling the actuator comprises:
    generating a nozzle control signal to control at least one of the actuatable spray nozzles.

11. The method of claim 10 wherein generating the time indicator comprises:
    receiving a speed signal indicative of a speed of travel of the actuatable spray nozzles on the sprayer;
    receiving a location indicator indicative of where the control action is to be performed;
    receiving a current time signal indicative of a current time, synchronized to the common time base; and
    generating the time indicator based on the geographic location of the sprayer, the speed of travel of the actuatable spray nozzles, the location where the control action is to be performed, and the current time.

12. The method of claim 1 wherein identifying a control action comprises:
    accessing a map indicative of where different control actions are to be performed; and
    identifying the control action based on the map and based on the sensed geographic location of the mobile agricultural machine.

13. A method of controlling a mobile agricultural planter, comprising:
    determining a difference between a first timing signal generated by a timing system in a display control system and a second timing signal generated by a timing system in a row unit control system;

receiving, at the row unit control system, a seed sensor signal indicative of a seed sensed by a seed sensor on a row unit of the mobile agricultural planter;

generating a time stamp corresponding to the seed sensor signal based on the difference between the first timing signal and the second tuning signal; and generating a mapping output signal to control a display mechanism to show a map of seed location based on the seed sensor signal and a time indicated by the corresponding time stamp.

14. The method of claim 13 wherein determining a difference comprises:

setting the first and second timing signals to a common value.

15. The method of claim 13 wherein determining a difference comprises:

synchronizing the first and second timing signals based on a reference time signal.

16. The method of claim 13 wherein generating a mapping output comprises:

accessing historic data indicative of locations of the mobile agricultural planter and corresponding times; and identifying a seed location corresponding to the time indicated by the time stamp based on the historic data.

17. The method of claim 13 wherein the mobile agricultural planter includes a plurality of different sections, each section comprising a plurality of different row units, each row unit having a row unit control system, and further comprising:

receiving from a plurality of different row unit control systems, at an intermediate control system, seed data, that is responsive to seed sensor signals received at the row unit control systems, and the corresponding time stamps;

identifying section data based on the seed data from the plurality of different row unit control systems; and sending the section data and corresponding time stamps to the display control system.

18. The method of claim 13 and further comprising:

sending the mapping output to a remote computing system.

19. A control system for controlling a mobile agricultural machine, comprising:

at least one processor; and a data store storing computer executable instructions which, when executed by the at least one processor, cause the at least one processor to perform steps, comprising:

receiving, at a first control system, control criteria for controlling the mobile agricultural machine;

identifying a control action to perform based on the control criteria;

generating a location indicator, indicative of a location of the mobile agricultural machine, at which the control action is to be performed;

receiving, at a second control system, a location sensor signal indicative of a sensed geographic location of the mobile agricultural machine;

sending a control action identifier, indicative of the identified control action, and the location indicator to the second control system; and generating an actuator control signal to control an actuator, with the second control system, to perform the control action at a location corresponding to the location indicator, based on the control action identifier, the sensed geographic location of the mobile agricultural machine and the location indicator.

20. The control system of claim 19 wherein receiving control criteria comprises:

obtaining a prescription indicator indicative of prescribed application of material to a field, wherein generating an actuator control signal comprises generating the actuator control signal to control a material application actuator to apply the material to the field.

* * * * *